US012712241B2

(12) United States Patent
Zhang et al.

(10) Patent No.: US 12,712,241 B2
(45) Date of Patent: Aug. 18, 2026

(54) HIGH-STRENGTH SEPARATOR

(71) Applicant: Asahi Kasei Battery Separator Corporation, Tokyo (JP)

(72) Inventors: Xun Zhang, Tokyo (JP); Ryo Kuroki, Tokyo (JP); Yuichiro Ido, Tokyo (JP); Kensuke Niimura, Tokyo (JP); Tomoki Ishikawa, Tokyo (JP)

(73) Assignee: Asahi Kasei Battery Separator Corporation, Tokyo (JP)

( * ) Notice: Subject to any disclaimer, the term of this patent is extended or adjusted under 35 U.S.C. 154(b) by 0 days.

(21) Appl. No.: 18/217,738

(22) Filed: Jul. 3, 2023

(65) Prior Publication Data

US 2023/0344078 A1 Oct. 26, 2023

Related U.S. Application Data

(62) Division of application No. 16/977,996, filed as application No. PCT/JP2019/037608 on Sep. 25, 2019.

(30) Foreign Application Priority Data

Sep. 25, 2018 (JP) ................................ 2018-179491
Sep. 25, 2018 (JP) ................................ 2018-179515

(51) Int. Cl.

*H01M 50/40* (2021.01)
*H01M 10/04* (2006.01)
*H01M 10/05* (2010.01)
*H01M 10/0525* (2010.01)
*H01M 50/406* (2021.01)
*H01M 50/417* (2021.01)
*H01M 50/431* (2021.01)
*H01M 50/48* (2021.01)
*H01M 50/489* (2021.01)
*H01M 50/491* (2021.01)
*H01M 50/494* (2021.01)

(52) U.S. Cl.

CPC ..... *H01M 50/431* (2021.01); *H01M 10/0486* (2013.01); *H01M 10/0525* (2013.01); *H01M 50/406* (2021.01); *H01M 50/417* (2021.01); *H01M 50/489* (2021.01); *H01M 50/491* (2021.01); *H01M 50/494* (2021.01)

(58) Field of Classification Search

None

See application file for complete search history.

(56) References Cited

U.S. PATENT DOCUMENTS 5,624,627 A 4/1997 Yagi et al.
6,824,865 B1 11/2004 Funaoka et al.
2003/0193110 A1 10/2003 Yaritz et al.
2005/0058823 A1* 3/2005 Funaoka ............ H01M 50/417 264/41
2008/0096102 A1 4/2008 Hatayama et al.
2011/0223407 A1 9/2011 Ban et al.
2012/0115008 A1 5/2012 Sano et al.
2013/0043613 A1 2/2013 Kawasoe
2013/0319601 A1 12/2013 Li
2015/0188108 A1 7/2015 Miyazawa et al.
2016/0181584 A1* 6/2016 Hatayama ........... H01M 50/489
2017/0155111 A1 6/2017 Takata et al.
2017/0155115 A1 6/2017 Takata et al.
2020/0067138 A1 2/2020 Hashiwaki et al.

FOREIGN PATENT DOCUMENTS

CN 101014649 A 8/2007
CN 102271791 A 12/2011
CN 102666690 A 9/2012
CN 104428920 A 3/2015
CN 106992279 A 7/2017
EP 3594278 A1 1/2020
JP H04-212264 A 8/1992
JP H11-302436 A 11/1999
JP 2000-212321 A 8/2000
JP 2001-011223 A 1/2001
JP 2001-096614 A 4/2001
JP 2002-088189 A 3/2002
JP 2005-526882 A 9/2005

(Continued)

OTHER PUBLICATIONS

International Search Report issued in corresponding International Patent Application No. PCT/JP2019/037608 dated Dec. 24, 2019.
Zhang et al., "Testing of Air Permeability of Textiles," Luthai Textile Co., Ltd. (Dec. 31, 2009).
Planning Textbooks for the 12th Five-Year Plan of General Higher Education: "X-ray Diffraction of Polycrystalline Material-Experimental principles, methods and applications" (Sep. 30, 2012).
Supplementary European Search Report issued in corresponding European Patent Application No. 19867650.4 dated Dec. 3, 2021.
Kabeya et al., "Nonlinear Viscoelasticity of Melts of High Density Polyethylenes," Journal of the Society of Materials Science, Japan, 64 (1): 47-51 (2015).

(Continued)

*Primary Examiner* — Barbara L Gilliam
*Assistant Examiner* — Angela J Martin
(74) *Attorney, Agent, or Firm* — Morgan, Lewis & Bockius LLP

(57) ABSTRACT

A separator for an electricity storage device has a cross-sectional crystal orientation of 0.85 or greater, and/or a method for producing the separator for an electricity storage device comprises a step of using a continuous mixer under conditions with a temperature of 20° C. to 70° C., a shear rate of 100 to 400,000 seconds$^{-1}$ and a residence time of 1.0 seconds to 60 seconds, for mixing of polyethylene-containing polyolefin powder with a plasticizer to produce a mixed slurry, a step of extruding the mixed slurry and cooling it to solidification to process it into a cast sheet, and a step of biaxially stretching the cast sheet to an area increase factor of 20 to 200.

18 Claims, 1 Drawing Sheet

(56) References Cited

FOREIGN PATENT DOCUMENTS

| | | | |
|---|---|---|---|
| JP | 2009-269941 | A | 11/2009 |
| JP | 2010-245028 | A | 10/2010 |
| JP | 2012-094450 | A | 5/2012 |
| JP | 2014-105302 | A | 6/2014 |
| JP | 2014-112480 | A | 6/2014 |
| JP | 2014-118515 | A | 6/2014 |
| JP | 2014-118535 | A | 6/2014 |
| JP | 2017-080977 | A | 5/2017 |
| JP | 2017-103044 | A | 6/2017 |
| JP | 2017-162755 | A | 9/2017 |
| JP | 7351943 | B | 9/2023 |
| KR | 10-2014-0083664 | A | 7/2014 |
| WO | 00/20492 | A1 | 4/2000 |
| WO | 2011/118660 | A1 | 9/2011 |
| WO | 2012/174998 | A1 | 12/2012 |
| WO | 2018/078710 | A1 | 5/2018 |
| WO | 2018/164056 | A1 | 9/2018 |

OTHER PUBLICATIONS

ISO 5636-5 Paper and board—Determination of air permeance and air resistance (medium range)—Part 5: Gurley method International Standard ISO/IEC, ISO/IEC International Standard 13818-1:2000(E), Geneva, vol. ISO 5636, 1-8 (Jun. 1, 2003).

International Preliminary Report on Patentability and Written Opinion issued in corresponding International Patent Application No. PCT/JP2019/037608 dated Apr. 8, 2021.

Extended European Search report issued in European Patent Application No. 24154598.7 dated Jun. 4, 2024.

Office Action issued in corresponding European Patent Application No. 19867650.4 dated May 29, 2024.

Hussain et al., "Ultra-High-Molecular-Weight-Polyethylene (UHMWPE) as a Promising Polymer Material for Biomedical Applications, A Concise Review," Polymers, 12 (2): 323 (2020).

* cited by examiner

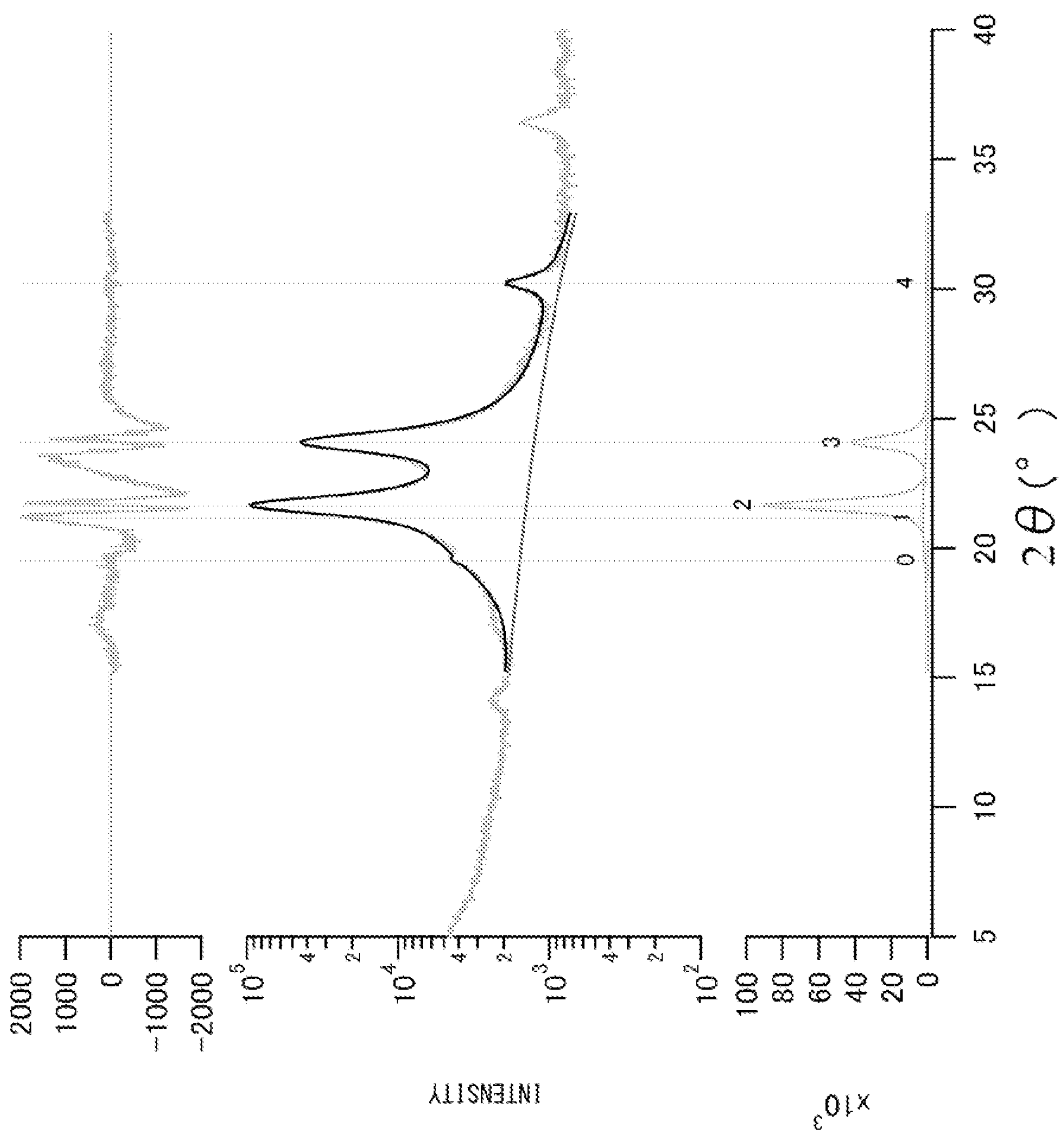
INTENSITY
$\times 10^3$
$2\theta$ (°)
2000
1000
0
−1000
−2000
$10^5$
$10^4$
$10^3$
$10^2$
100
80
60
40
20
0
5
10
15
20
25
30
35
40
0
1
2
3
4

HIGH-STRENGTH SEPARATOR

FIELD

The present invention relates to a separator for an electricity storage device, to a method for producing a separator for an electricity storage device, and to a method for producing a polyolefin microporous membrane.

BACKGROUND

Microporous membranes are widely used as membranes for separation or selective permeation and selection of various substances and as isolating materials, and their uses include, for example, uses as microfiltration membranes, as fuel cell and condenser separators, or as matrices for functional membranes or separators for electricity storage devices, that exhibit new functions by having functional materials packed into their pores. Polyolefin microporous membranes, specifically, are preferred for use as separators for lithium ion batteries that are widely utilized in laptop computers, cellular phones and digital cameras.

Polyolefin microporous membranes are generally produced using polyethylene of relatively low molecular weight, but in recent years it has been attempted to use polyethylene of relatively high molecular weight to produce polyolefin microporous membranes suitable for use as separators for lithium ion batteries (PTLs 1 to 3).

In order to maintain mechanical strength and shutdown properties for a separator for an electricity storage device while preventing a phenomenon in which the electrolyte solution is no longer held in the holes of the separator (liquid shortage reduction), PTL 1 proposes using a first polyethylene with a weight-average molecular weight of 1,000,000 or greater and a second polyethylene with a density of 0.942 g/cm$^3$ or greater, and specifically, for production of a polyethylene microporous membrane it uses a first polyethylene powder with a weight-average molecular weight of 4,150,000 and a melting point of 141° C. and a second polyethylene powder with a weight-average molecular weight of 560,000 and a melting point of 135° C.

In order to inhibit cutting defects during cutting of a non-aqueous electrolyte battery separator with a blade and to provide an excellent shutdown property, PTL 2 describes using polyethylene with a weight-average molecular weight of 500,000 or greater as the main component of a separator, and adjusting the area ratio I (110)/(I (110)+I (200)), represented by the diffraction peak area I (110) on the (110) plane and the diffraction peak area I (200) on the (200) plane during X-ray irradiation in the membrane thickness direction of the separator, to 0.90 or greater.

PTL 3 describes a method for producing a polyolefin microporous membrane that includes a step of melt kneading a resin composition containing a polyolefin resin with a weight-average molecular weight of 500,000 or greater and a liquid paraffin, casting the melt-kneaded product into a sheet and then subjecting the cast sheet to rolling treatment to remove the liquid paraffin, and proposes melt kneading of the resin composition after it has been pre-mixed using a stirrer comprising a butterfly blade rotating at a speed of 10 to 500 rpm and a turbine blade rotating at a speed of 500 to 3000 rpm.

CITATION LIST

Patent Literature

[PTL 1] International Patent Publication No. WO2011/118660

[PTL 2] Japanese Unexamined Patent Publication No. 2017-103044

[PTL 3] Japanese Unexamined Patent Publication No. 2002-88189

SUMMARY

Technical Problem

It is known in the field of microporous membranes that ultrahigh molecular weight polyethylene (UHMWPE) is difficult to cast.

In the technology described in PTL 1 or 2, for formation of a polyolefin microporous membrane using ultrahigh molecular weight polyethylene having a viscosity-average molecular weight Mw of 300,000 to 900,000 and a degree of dispersion (weight-average molecular weight Mw/number-average molecular weight Mn) of 3 to 15, there is still room for improvement in terms of quality as a separator for an electricity storage device, such as low gelling, low molecular weight degradation, battery safety and cycle properties and separator strength, including tensile strength and puncture strength.

The method for producing a polyolefin microporous membrane described in PTL 3 still needs further research from the viewpoint of the conditions that allow each of the steps to be carried out for polyolefin resins with weight-average molecular weights of 500,000 or greater. The polyolefin microporous membrane obtained by the method of PTL 3 also has room for improvement in terms of its quality as a separator for a lithium ion battery, including low gelling and reduced molecular weight degradation, as well as separator strength including tensile strength and puncture strength.

In light of these circumstances, it is an object of the present invention to provide a separator for an electricity storage device having usable quality, and a polyolefin microporous membrane for formation of the same.

Solution to Problem

The present inventors have completed this invention upon finding that the aforementioned problems can be solved by using a mixed slurry comprising a liquid plasticizer and ultrahigh molecular weight polyethylene (UHMWPE) for extrusion and casting, either by specifying the polyethylene crystallinity used in the separator for an electricity storage device based on X-ray diffraction (XRD), or under specific conditions, to form pores in the resulting molded article. Specifically, the present invention is as follows.

[1]

A separator for an electricity storage device having a cross-sectional crystal orientation of 0.85 or greater.

[2]

The separator for an electricity storage device according to [1] above, wherein the specific surface area S of the separator for an electricity storage device per 1 nm$^3$ is $1\times10^{-2}$ nm$^2$ to $5\times10^{-2}$ nm$^2$.

[3]

The separator for an electricity storage device according to [1] or [2], wherein the equivalent mean pore size calculated according to Porod's law is 50 nm to 150 nm, for small angle X-ray scattering (SAXS) measurement of the separator for an electricity storage device.

[4]

The separator for an electricity storage device according to any one of [1] to [3], wherein the separator for an electricity storage device includes polyethylene (PE), and the crystallite size of the polyethylene is 14.2 nm to 40.0 nm.

[5]

The separator for an electricity storage device according to any one of [1] to [4], wherein the separator for an electricity storage device includes ultrahigh molecular weight polyethylene (UHMWPE).

[6]

The separator for an electricity storage device according to any one of [1] to [5], wherein the cross-sectional crystal orientation is 0.99 or lower.

[7]

A polyolefin microporous membrane that includes ultra-high molecular weight polyethylene (UHMWPE) having a viscosity-average molecular weight (Mv) of 300,000 to 9,000,000 and a degree of dispersion (Mw/Mn) represented as the ratio of weight-average molecular weight (Mw) to number-average molecular weight (Mn), of 3 to 15, wherein the polyolefin microporous membrane is used as a separator for an electricity storage device, the degree of crystallinity of the polyethylene of the polyolefin microporous membrane is 80 to 99% as measured by X-ray diffraction (XRD), and the crystallite size of the polyethylene of the polyolefin microporous membrane is 14.2 to 40.0 nm as measured by XRD.

[8]

The polyolefin microporous membrane according to [7] above, wherein the cross-sectional crystal orientation of the polyolefin microporous membrane is 0.80 to 0.99.

[9]

The polyolefin microporous membrane according to [7] or [8], wherein the equivalent mean pore size calculated according to Porod's law is 50 to 150 nm, according to small angle X-ray scattering (SAXS) measurement of the polyolefin microporous membrane.

[10]

The polyolefin microporous membrane according to any one of [7] to [9], wherein the equivalent transmission coefficient per 10 μm of membrane thickness, represented by the following formula 6:

$$10\ \mu\text{m-equivalent transmission coefficient } (J) = \text{Air permeability } (Pe) \div \text{porosity } (Po) \quad \text{(Formula 6),}$$

is 0.5 to 14.

[11]

The polyolefin microporous membrane according to any one of [7] to [10], wherein the UHMWPE is poly(ethylene and/or propylene-co-α-olefin).

[12]

The polyolefin microporous membrane according to any one of [7] to [11], wherein the UHMWPE is one or more selected from the group consisting of poly(ethylene-co-propylene), poly(ethylene-co-butene) and poly(ethylene-co-propylene-co-butene).

[13]

The polyolefin microporous membrane according to any one of [7] to [12], wherein the UHMWPE includes an ethylene-derived structural unit at 98.5 mol % to 100 mol %.

[14]

The polyolefin microporous membrane according to any one of [7] to [13], wherein the UHMWPE includes a structural unit derived from an α-olefin other than ethylene at greater than 0.0 mol % and 1.5 mol % or less.

[15]

The polyolefin microporous membrane according to any one of [7] to [14], wherein the weight ratio of the UHMWPE is 2 weight % to 90 weight % with respect to the total weight of all of the powder starting materials of the polyolefin microporous membrane.

[16]

The polyolefin microporous membrane according to any one of [7] to [15], wherein the weight ratio of the UHMWPE is 5 weight % to 70 weight % with respect to the total weight of all of the powder starting materials of the polyolefin microporous membrane.

[17]

A method for producing a polyolefin microporous membrane to be used as a separator for a lithium ion secondary battery, wherein the method comprises the following steps:

(1) a step of using a continuous mixer under conditions with a temperature of 20° C. to 70° C., a shear rate of 100 seconds$^{-1}$ to 400,000 seconds$^{-1}$ and a residence time of 1.0 seconds to 60 seconds, for mixing of a plasticizer with a polyolefin powder containing polyethylene (PE), to obtain a mixed slurry;

(2) a step of loading the mixed slurry into a twin-screw extruder and extruding the mixed slurry to produce a resin composition;

(3) a step of extruding the resin composition into a sheet and cooling the sheet to solidification to process the solidification into a cast sheet;

(4) a step of biaxially stretching the cast sheet in an area increase factor of 20 times to 200 times, to form a stretched sheet;

(5) a step of extracting the plasticizer from the stretched sheet to form a porous body; and (6) a step of heat treating the porous body at a temperature below the melting point of the porous body, and stretching the porous body.

[18]

The method for producing a polyolefin microporous membrane according to [17], wherein swelling, melting and/or kneading of the polyolefin powder is carried out in the twin-screw extruder in step (2).

[19]

The method for producing a polyolefin microporous membrane according to [17] or [18], wherein the polyethylene is ultrahigh molecular weight polyethylene (UHMWPE), and the content of UHMWPE in the polyolefin powder is 2 weight % to 90 weight % based on the weight of the polyolefin powder.

[20]

The method for producing a polyolefin microporous membrane according to any one of [17] to [19], wherein the polyethylene is ultrahigh molecular weight polyethylene (UHMWPE), and the UHMWPE has a viscosity-average molecular weight (Mv) of 300,000 to 9,700,000 and a molecular weight distribution (Mw/Mn), represented as the ratio of the weight-average molecular weight (Mw) with respect to the number-average molecular weight (Mn), of 3 to 15.

[21]

The method for producing a polyolefin microporous membrane according to any one of [17] to [20], wherein the mixed slurry is fed to the twin-screw extruder at a temperature of 25° C. to 80° C. in step (2) to produce the resin composition.

[22]

The method for producing a polyolefin microporous membrane according to any one of [17] to [21], wherein the porous body is stretched in the transverse direction and/or the lengthwise direction in step (6).

Advantageous Effects of Invention

According to the invention it is possible to provide a separator for an electricity storage device with high quality and high strength and a polyolefin microporous membrane to be used in it, and to improve the compression resistance of the separator for an electricity storage device or polyolefin microporous membrane in the direction of its thickness (cross-section). The present invention allows a mixed slurry to be provided to an extrusion step, so that it is possible to reduce molecular weight degradation and/or result in an excellent handling property in some cases, compared to a powder or solid mixture.

BRIEF DESCRIPTION OF DRAWINGS

FIG. 1 is a graph showing the relationship between diffraction angle and diffraction intensity in X-ray diffraction (XRD) of a polyolefin microporous membrane according to an embodiment of the invention.

DESCRIPTION OF EMBODIMENTS

Embodiments for carrying out the invention (hereunder referred to simply as "embodiments") will now be explained in detail. The present invention is not limited to the embodiments described below, however, and various modifications may be implemented within the scope of the gist thereof.

The physical properties and evaluated values described herein are those measured or calculated by the methods described in the Examples, unless otherwise specified.

<Separator for Electricity Storage Device>

Because a separator for an electricity storage device (hereunder also referred to simply as "separator") must have an insulating property and lithium ion permeability, it is generally formed from paper, a polyolefin nonwoven fabric or a resin microporous membrane, as an insulating material with a porous body structure. A polyolefin microporous membrane that allows construction of a compact homogeneous porous structure with redox degradation resistance of the separator is excellently suited for a lithium ion battery.

The separator may be in the form of a flat membrane (formed by a single microporous membrane, for example), a laminated membrane (for example, a laminated stack of a plurality of polyolefin microporous membranes or a laminated stack of a polyolefin microporous membrane and another membrane), or a coating membrane (when at least one side of the polyolefin microporous membrane is coated with a functional substance).

The separator of the first embodiment has a cross-sectional crystal orientation of 0.85 or greater. With a cross-sectional crystal orientation of ≥0.85, a separator tends to have good separator quality, such as low gelling, reduced molecular weight degradation and battery safety and cycle properties, as well as separator strength including compression resistance in the direction of the separator thickness (z), and both tensile strength and puncture strength. The effect of compression resistance in the direction of thickness (cross-sectional direction) is industrially valuable, as explained below.

With increasing high capacity of lithium ion batteries in recent years there has been a shift in use of the active material for the positive electrode, from the conventional type with a nickel:manganese:cobalt ratio of 1:1:1 to a high nickel-containing type with a nickel:manganese:cobalt ratio of 8:1:1, with even higher nickel contents in some cases. The negative electrode material has been changed from graphite to silicon or silicon-containing types, and as a result the density of batteries has been steadily increasing. In all cases, however, significant expansion and contraction of the electrodes takes place during the battery charge-discharge process, which exerts compressive force on the separator and leads to membrane thickness reduction and increased air permeability of the separator, and results in lower ion conductivity and impaired cycle characteristics.

Most processes for producing on-vehicle batteries, on the other hand, are carried out while compacting the stacked state of the electrodes and separator, and the compaction is often carried out while heating in order to obtain a greater degree of adhesion between the materials and an increased production rate.

Therefore, in order to obtain a high capacity battery that can be used for prolonged periods without impairing the physical properties of the separator even during the battery production steps, the invention provides a separator that exhibits satisfactory compression resistance (with no reduction in membrane thickness) under conditions of compression in a specific direction, such as the direction of thickness (cross-sectional direction, z), and from the viewpoint of polymer chemistry, it provides the finding that the cross-sectional crystal orientation is the most important controlling factor to maintain such resistance, with other controlling factors including the specific surface area (S) per 1 $nm^3$, the equivalent mean pore size and the crystallite size of the polyethylene in the separator.

The cross-sectional crystal orientation can be calculated by wide-angle X-ray scattering measurement of a single membrane sample by the transmission method described in the Examples.

For the present purpose, when the separator is a flat membrane it is provided for X-ray scattering or X-ray diffraction measurement. When the separator is a laminated membrane, a single membrane sample is removed from the laminated membrane and provided for X-ray scattering or X-ray diffraction measurement. When the separator is a coating membrane, the coating membrane is provided for X-ray scattering or X-ray diffraction measurement. The X-ray scattering measurement and X-ray diffraction measurement can be carried out by the methods described in the Examples.

While it is not our intention to be constrained by any particular theory, it is believed that when a separator has a cross-sectional crystal orientation of ≥0.85 in wide-angle X-ray scattering measurement, the c-axis is randomly oriented on the projection plane while the c-axis is oriented essentially parallel to the surface of the membrane sample on the cross-sectional plane and the crystal phase approaches perfect orientation (i.e. the amorphous phase also approaches perfect orientation), and that this renders it able to withstand stress in a specific direction, such as compression in the thickness (z) direction. The cross-sectional crystal orientation of the separator is preferably 0.86 or greater or 0.87 or greater, and more preferably 0.88 or greater or 0.89 or greater, from the viewpoint of compression resistance and mechanical strength in the z-direction. The cross-sectional crystal orientation of the separator is also preferably 0.99 or lower and more preferably 0.98 or lower or 0.97 or lower, from the viewpoint of handleability and flexibility during device fabrication.

For the first embodiment, from the viewpoint of improved separator quality and compression resistance in the z-direction, the specific surface area per 1 $nm^3$ of the separator is preferably $1\times10^{-2}$ $nm^2$ to $5\times10^{-2}$ $nm^2$ and more preferably $1.4\times10^{-2}$ $nm^2$ to $4.5\times10^{-2}$ $nm^2$. The specific surface area (S) represents the specific surface area per unit volume of the separator on the nano order, and it can be controlled by the spatial structure or internal structure of the separator. When the separator includes a microporous membrane, the specific surface area (S) can also be controlled by adjusting the microporosity. The specific surface area S per 1 $nm^3$ of the separator is measured during small angle X-ray scattering measurement by the transmission method described in the Examples.

For small angle X-ray scattering (SAXS) measurement of the separator according to the first embodiment, the equivalent mean pore size calculated according to Porod's law is preferably 50 nm to 150 nm, and more preferably 55 nm to 145 nm or 91 nm to 136 nm from the viewpoint of increasing the compression resistance in the z-direction and the tensile strength and puncture strength. While the reason for this preferred range is not completely understood, it is believed that it is because the dynamic strength of the separator is strongly influenced by the mean pore size, and that this range particularly contributes to stress dispersion due to the relationship between the membrane thickness range commonly employed for lithium ion battery separators (≤25 μm) and the crystallite size of the invention, and thus inhibits concentration of stress in specific defects of the sample membrane being measured. In addition, presumably the ease with which lithium ion clusters pass through the membrane interior in the battery is strongly correlated with the sizes of the clusters and the actual mean pore size of the membrane measured by SAXS in a non-contact manner, and the ion resistance can therefore be adjusted to a suitable range as a result. Since the cycle characteristics are satisfactory and the resistance during charge-discharge is low in this mean pore size range, it is surmised that the solid electrolyte interface (SEI) formed on the electrode surface during initial charge-discharge is extremely uniform. The method of calculating the equivalent mean pore size according to Porod's law during small angle X-ray scattering measurement will be described in detail in the Examples.

When the separator of the first embodiment includes polyethylene, the crystallite size of the polyethylene is preferably 14.2 nm to 40.0 nm with measurement of the separator by X-ray diffraction (XRD). In XRD of polyethylene, the crystallite size represents the thickness of the crystals in the direction perpendicular to the polyethylene molecular chains. If the crystallite size of the polyethylene is in the range of 14.2 nm to 40.0 nm, presumably cleavage points in the polyethylene diffuse allowing concentration of stress to be inhibited, thereby tending to result in a level of quality, strength and z-directional compression resistance that are suitable for use as a separator for an electricity storage device. This tendency is more notable when the separator includes ultrahigh molecular weight polyethylene (UHMWPE), which has conventionally been problematic for casting.

In order to further improve the quality and z-directional compression resistance of the separator, the crystallite size of the polyethylene by XRD measurement of the separator is preferably 15.0 nm to 35.0 nm, more preferably 15.5 nm to 36.5 nm and even more preferably 16.0 nm to 36.0 nm. XRD can be carried out by the method described in the Examples.

The constituent elements of the separator will now be described.

<Polyolefin Microporous Membrane>

The polyolefin microporous membrane of the second embodiment includes ultrahigh molecular weight polyethylene (UHMWPE). Throughout the present specification, ultrahigh molecular weight polyethylene (UHMWPE) is polyethylene having a viscosity-average molecular weight (Mv) of 300,000 to 9,000,000, and a degree of dispersion (Mw/Mn), as the ratio of the weight-average molecular weight (Mw) to the number-average molecular weight (Mn), of 3 to 15.

Since the polyolefin microporous membrane has a homogeneous porous structure that is dense and resistant to redox degradation, it can be used in a separator for an electricity storage device, included in a separator, or used to form a flat membrane separator. The polyolefin microporous membrane of the second embodiment can also be used to form a separator according to the first embodiment.

The polyolefin microporous membrane of the second embodiment has a degree of crystallinity of the polyethylene of 80% to 99% and a crystallite size of the polyethylene of 14.2 nm to 40.0 nm, as measured by X-ray diffraction (XRD). In XRD of the polyethylene, the degree of crystallinity represents the proportion of the crystal phase in the polyethylene, while the crystallite size represents the thickness of crystals in the direction perpendicular to the polyethylene molecular chains. For the purpose of the present specification, the polyethylene measured by XRD in the polyolefin microporous membrane may also include polyethylene other than UHMWPE, in addition to the UHMWPE.

If the degree of crystallinity of the polyethylene is in the range of 80% to 99% and the crystallite size is in the range of 14.2 nm to 40.0 nm, it will be possible to provide a microporous membrane with quality and strength suitable for a separator for an electricity storage device, using UHMWPE that has conventionally been problematic for casting. It is believed that the crystallite size of 14.2 nm to 40.0 nm allows the cleavage points in the polyethylene to be diffused to inhibit concentration of stress, despite the relatively high degree of crystallinity of the polyethylene (i.e. the relatively low proportion of amorphous phase).

In order to further improve the quality and strength of the polyolefin microporous membrane used in a separator for an electricity storage device, the degree of crystallinity of the polyethylene in XRD measurement of the polyolefin microporous membrane is preferably 82% to 97% and more preferably 84% to 96% or 86% to 94%, and/or the crystallite size of the polyethylene is preferably 15.0 nm to 35.0 nm, more preferably 15.5 nm to 36.5 nm and even more preferably 16.0 nm to 36.0 nm.

XRD of the polyolefin microporous membrane can be carried out by the method described in the Examples.

From the viewpoint of using the separator for an electricity storage device, to exhibit satisfactory pliability for handling during fabrication of the device, and to obtain high mechanical strength, the cross-sectional crystal orientation of the polyolefin microporous membrane is preferably 0.80 to 0.99, more preferably 0.81 to 0.98 and even more preferably 0.85 to 0.97 or 0.89 to 0.97. The cross-sectional crystal orientation can be calculated by wide-angle X-ray scattering measurement of the polyolefin microporous membrane by the transmission method. The wide-angle X-ray scattering measurement can be carried out by the method described in the Examples.

It is not our intention to be constrained by any particular theory regarding wide-angle X-ray scattering measurement of polyethylene, but the following (1) to (3) are possible:

(1) since the c-axis <001> plane and <110> plane are perpendicular in the polyethylene crystal structure, observation of the orientation of one side allows the orientation of the other side to be known;

(2) the orientation of the <110> plane can be known from the spread of scattering from the <110> plane in the declination direction; and (3) the full width at half maximum in the declination-scattering intensity plot is effective for quantification of the orientation of the <110> plane, with a sharper full width at half maximum corresponding to a higher degree of orientation of the polyethylene molecular chains.

In consideration of (1) to (3) above, when the cross-sectional crystal orientation is adjusted to a range of 0.80 to 0.99 for wide-angle X-ray scattering measurement of polyethylene, the c-axis is oriented randomly on the projection plane while the c-axis is oriented essentially parallel to the surface of the polyolefin microporous membrane in the cross-section, and the crystal phase approaches perfect orientation (i.e. the amorphous phase also approaches perfect orientation), thus rendering it able to withstand stress in a specific direction.

For small angle X-ray scattering (SAXS) measurement of a polyolefin microporous membrane, the equivalent mean pore size calculated according to Porod's law is preferably 50 nm to 150 nm, and more preferably 55 nm to 145 nm or 91 nm to 136 nm from the viewpoint of increasing the tensile strength and puncture strength. While the reason for this preferred range is not completely understood, it is believed that it is because the dynamic strength of the polyolefin microporous membrane is strongly influenced by the mean pore size, and that this range particularly contributes to stress dispersion due to the relationship between the membrane thickness range commonly employed for lithium ion battery separators (25 μm) and the crystallite size of the invention, and thus inhibits concentration of stress in specific membrane defects. In addition, presumably the ease with which lithium ion clusters pass through the membrane interior in the battery is strongly correlated with the sizes of the clusters and the actual mean pore size of the membrane measured by the aforementioned SAXS measurement in a non-contact manner, and the ion resistance can therefore be adjusted to a suitable range as a result. Moreover, since the cycle characteristics are satisfactory and the resistance during charge-discharge is low in this mean pore size range, it is surmised that the SEI formed on the electrode surface during initial charge-discharge is extremely uniform. The method of calculating the equivalent mean pore size according to Porod's law during small angle X-ray scattering measurement will be described in detail in the Examples.

Gas adsorption (1 to 100 nm) and mercury intrusion (1 to 100 μm) are commonly known methods for pore measurement of porous bodies. The separator to be used for the second embodiment has a meso-macro combined structure and presumably it cannot be used in a gas adsorption method. Mercury intrusion, on the other hand, is suitable for measurement in the range of a polyethylene microporous membrane to be used for the second embodiment, but since relatively high pressure is applied to the membrane during measurement, the polyethylene microporous membrane may collapse and undergo destruction of its structure, making measurement impossible. Another method other than gas adsorption and mercury intrusion is a method of calculating the pore diameter and tortuosity according to a tubular model (through pore size distribution measurement), by measuring the air permeability or water permeability, but since the separator to be used for the second embodiment has an extremely complex porous structure, there is no engineering model that can accurately describe it. For the second embodiment, X-ray structural analysis may be used for accurate statistical measurement of the porous structure of the polyethylene microporous membrane in a non-destructive manner, to relate it to the battery cycle performance or safety evaluation performance.

The equivalent transmission coefficient of the polyolefin microporous membrane per 10 μm of membrane thickness, represented by the following formula 6:

$$10\ \mu\text{m-equivalent transmission coefficient } (J) = \text{air permeability } (Pe) \div \text{porosity } (Po) \quad \text{(Formula 6)}$$

is preferably 0.5 to 14 and more preferably 0.7 to 13.8, from the viewpoint of high quality and strength allowing it to be used in a separator for an electricity storage device.

The properties of the polyolefin microporous membrane will now be described. These properties are for a polyolefin microporous membrane for a separator for an electricity storage device that is in a flat membrane form, but a separator for an electricity storage device that is in a laminated membrane form can be measured after removing the layers other than the microporous membrane from the laminated membrane.

The porosity of the polyolefin microporous membrane is preferably 20% or greater, more preferably 30% or greater and even more preferably 31% or greater. If the porosity of the microporous membrane is 20% or greater, its ability to follow rapid movement of lithium ions will be further increased. The porosity of the microporous membrane is also preferably 90% or lower, more preferably 80% or lower and even more preferably 50% or lower. If the porosity of the microporous membrane is 90% or lower, then the membrane strength will be further increased and self-discharge will tend to be inhibited. The porosity of the microporous membrane can be measured by the method described in the Examples.

The air permeability of the polyolefin microporous membrane is preferably 1 second or greater, more preferably 50 seconds or greater, even more preferably 55 seconds or greater, and more preferably 60 seconds or greater, 100 seconds or greater, 120 seconds or greater, 140 seconds or greater or 150 seconds or greater, per 100 $cm^3$. If the air permeability of the microporous membrane is 1 second or greater, the balance between the membrane thickness, porosity and mean pore size will tend to be improved. The air permeability of the microporous membrane is preferably 400 seconds or less, more preferably 320 seconds or less, and even more preferably 310 seconds or less, 300 seconds or less, 280 seconds or less or 270 seconds or less. A microporous membrane air permeability of 400 seconds or less will tend to result in increased ion permeability. The air permeability of the microporous membrane can be measured by the method described in the Examples.

The tensile strength of the polyolefin microporous membrane is preferably 1000 $kgf/cm^2$ or greater, more preferably 1050 $kgf/cm^2$ or greater and even more preferably 1100 $kgf/cm^2$ or greater, in both the MD direction and the TD direction (the direction perpendicular to the MD, or the transverse direction of the membrane). If the tensile strength is 1000 $kgf/cm^2$ or greater, then slitting or rupture during winding of the electricity storage device will tend to be further inhibited, or short circuiting due to contaminants in the electricity storage device will tend to be further inhibited. The tensile strength of the microporous membrane is also preferably 5000 $kgf/cm^2$ or lower, more preferably 4500 kgf/$cm^2$ or lower and even more preferably 4000 kgf/$cm^2$ or lower. If the tensile strength of the microporous membrane is 5000 kgf/$cm^2$ or lower, then the microporous membrane will undergo earlier relaxation to exhibit weaker contractive force during heat testing, thus tending to result in higher safety.

The membrane thickness of the polyolefin microporous membrane is preferably 1.0 μm or greater, more preferably 2.0 μm or greater, even more preferably 3.0 μm or greater, 4.0 μm or greater or 4.5 μm or greater, and yet more preferably 5.0 μm or greater. A microporous membrane thickness of 1.0 μm or greater will tend to result in increased membrane strength. The membrane thickness of the microporous membrane is also preferably 500 μm or smaller, more preferably 100 μm or smaller and more preferably 80 μm or smaller, 22 μm or smaller or 19 μm or smaller. A microporous membrane thickness of 500 μm or smaller will tend to result in increased ion permeability. The membrane thickness of the microporous membrane can be measured by the method described in the Examples.

When the polyolefin microporous membrane is a separator to be used in a relatively high-capacity lithium ion secondary battery of recent years, the membrane thickness of the microporous membrane is preferably 25 μm or smaller, more preferably 22 μm or smaller or 20 μm or smaller, even more preferably 18 μm or smaller and most preferably 16 μm or smaller, 14.0 μm or smaller or 12.0 μm or smaller. In this case, a microporous membrane thickness of 25 μm or smaller will tend to result in increased permeability. The lower limit for the microporous membrane thickness may be 1.0 μm or greater, 3.0 μm or greater, 4.0 μm or greater or 5.0 μm or greater.

Optionally, the polyolefin microporous membrane may include polyethylene other than UHMWPE, a polyolefin other than polyethylene, a resin other than a polyolefin, and various additives.

<Ultrahigh Molecular Weight Polyethylene (UHMWPE)>

Ultrahigh molecular weight polyethylene (UHMWPE) is polyethylene having a viscosity-average molecular weight (Mv) of 300,000 to 9,700,000, and a degree of dispersion (Mw/Mn), as the ratio of the weight-average molecular weight (Mw) to the number-average molecular weight (Mn), of 3 to 15.

The viscosity-average molecular weight (Mv) of the UHMWPE is preferably 320,000 to 9,000,000 and more preferably 350,000 to 8,500,000. The degree of dispersion of the UHMWPE is preferably 3 to 15, 4 to 14 or 4 to 13.

The viscosity-average molecular weight (Mv) can be measured with high precision and reproducibility regardless of the molecular weight, whereas for the number-average molecular weight (Mn) and weight-average molecular weight (Mw) determined by GPC measurement, and the degree of dispersion that is represented as their ratio (Mw/Mn), in the range of 1,000,000 and greater the molecular weight is the column exclusion volume limit, making accurate measurement impossible. However, highly precise and reproducible measurement is possible in the molecular weight range of 1,000,000 and lower, allowing determination of the number-average molecular weight (Mn) and weight-average molecular weight (Mw), and calculation of the degree of dispersion represented as their ratio (Mw/Mn). Experimentation with molecular weights in the range of 1,000,000 or lower has also shown that when the same type of polyethylene polymerization catalyst is used, the degree of dispersion (Mw/Mn) does not change even if the number-average molecular weight (Mn) and weight-average molecular weight (Mw) change. While accurate measurement of the number-average molecular weight (Mn) and weight-average molecular weight (Mw) is impossible for UHMWPE with a molecular weight of 1,000,000 or greater, for the purpose of invention, the degree of dispersion represented as their ratio (Mw/Mn) was investigated using values calculated for a range of 1,000,000 or lower, polymerized using the same type of polyethylene polymerization catalyst.

For the first and second embodiments, either the same or different types of UHMWPE may be used. From the viewpoint of high strength as a polyolefin microporous membrane, the UHMWPE is preferably a poly(ethylene and/or propylene-co-α-olefin), and more preferably one or more selected from the group consisting of poly(ethylene-co-propylene), poly(ethylene-co-butene) and poly(ethylene-co-propylene-co-butene). From the same viewpoint, the UHMWPE preferably includes an ethylene-derived structural unit at 98.5 mol % to 100 mol %, and more preferably it includes a structural unit derived from an α-olefin other than ethylene at greater than 0.0 mol % and 1.5 mol % or less.

From the viewpoint of high strength, the weight ratio of the UHMWPE is preferably 5 weight % to 70 weight % and more preferably 7 weight % to 68 weight %, with respect to the total weight of all of the powder starting materials of the polyolefin microporous membrane.

<Polyethylene Other than UHMWPE>

Examples of polyethylene other than UHMWPE include high-density polyethylene (HDPE), linear low-density polyethylene (LLDPE), high-pressure low-density polyethylene, and mixtures of the same. Polyethylene with a narrow molecular weight distribution, obtained using a metallocene catalyst, and HDPE obtained by multistage polymerization, may also be used. Such polyethylene types may be used alone or in combinations, to constitute the remaining portion of a polyolefin microporous membrane that includes UHMWPE.

<Polyolefins Other than Polyethylene>

Examples of polyolefins other than polyethylene include polypropylene, polybutene, ethylene-propylene copolymer, polymethylpentene and silane graft-modified polyolefins. Such polyolefin types may be used alone or in combinations, to constitute the remaining portion of a polyolefin microporous membrane that includes UHMWPE.

<Resins Other than Polyolefins>

Examples of resins other than polyolefins include engineering plastic resins such as polyphenylene ethers; polyamide resins such as nylon 6, nylon 6-12 and aramid resins; polyimide-based resins; polyester-based resins such as polyethylene terephthalate (PET) and polybutene terephthalate (PBT); polycarbonate-based resins; fluorine-based resins such as polyvinylidene fluoride (PVDF) and polytetrafluoroethylene; copolymers of ethylene and vinyl alcohol, copolymers of $C_2$-$C_{12}$ α-olefins and carbon monoxide, and their hydrogenated forms; hydrogenated styrene-based copolymers; copolymers of styrene and α-olefins, and their hydrogenated forms; copolymers of styrene and aliphatic monounsaturated fatty acids; polymers of (meth)acrylic acid, (meth)acrylate and/or their derivatives; thermoplastic resins selected from among copolymers of styrene and conjugated diene-based unsaturated monomers, and their hydrogenated forms; and polysulfones, polyethersulfones and polyketones. Such resins may be used alone or in combinations, to constitute the remaining portion of a polyolefin microporous membrane that includes UHMWPE.

<Additives>

The polyolefin microporous membrane may optionally contain publicly known additives in addition to the UHMWPE, such as dehydrating condensation catalysts, metal soaps such as calcium stearate or zinc stearate, ultraviolet absorbers, light stabilizers, antistatic agents, antifogging agents and color pigments.

<Method for Producing Polyolefin Microporous Membrane>

The polyolefin microporous membrane may be produced by any desired method known in the technical field so long as the polyolefin microporous membrane has the crystalline structure described above. For example, formation of the polyolefin membrane may be carried out by melt extrusion of a polyolefin resin and subsequent stretching, and the pore formation may be by a wet method.

Examples of wet methods include a method of adding a pore-forming material such as a plasticizer to a polyolefin and dispersing and casting it, and then extracting the pore-forming material with a solvent to form pores, if necessary carrying out stretching before and after the extraction.

One example of means for controlling the degree of crystallinity of the polyethylene to the range of 80 to 99% and the crystallite size of the polyethylene to the range of 14.2 to 40.0 nm based on XRD measurement of the polyolefin microporous membrane, is adjustment of the resin composition in the starting materials for the polyolefin microporous membrane, or extrusion, kneading and casting using a mixed slurry of the UHMWPE and a liquid plasticizer such as liquid paraffin, and forming pores in the molded article by a wet method.

The method for producing a polyolefin microporous membrane according to a third embodiment includes the following steps:

(1) a mixed slurry producing step in which a continuous mixer is used under conditions with a temperature of 20° C. to 70° C., a shear rate of 100 seconds$^{-1}$ to 400,000 seconds$^{-1}$ and a residence time of 1.0 seconds to 60 seconds, for mixing of a plasticizer with a polyolefin powder containing polyethylene (PE), to obtain a mixed slurry;

(2) an extrusion step in which the mixed slurry is loaded into a twin-screw extruder and extruded to produce a resin composition;

(3) a step of extruding the resin composition into a sheet and cooling it to solidification to process it into a cast sheet;

(4) a step of biaxially stretching the cast sheet to an area increase factor of 20 to 200, to form a stretched sheet;

(5) a step of extracting the plasticizer from the stretched sheet to form a porous body; and (6) a step of heat treating the porous body at a temperature below the melting point of the porous body, and stretching the porous body.

While it is not our intention to be limited to any particular theory, presumably subjecting the mixed slurry of PE and a plasticizer obtained by the (1) mixed slurry producing step to the (2) extrusion step, (3) sheet-forming step, (4) stretching step, (5) extraction step and (6) heat treatment step yields a homogeneous resin composition even without applying excessive shear force in the (2) extrusion step, thus helping to prevent generation of unmelted gel or molecular weight reduction in the microporous membrane containing the PE, and allowing high quality and high strength to be achieved when it is used in a separator for a lithium ion secondary battery.

Moreover, without being limited to any particular theory, presumably feeding the PE and plasticizer in a uniform manner to the extruder in step (2) for the third embodiment allows homogeneous kneading to be carried out, thus ensuring homogeneous dispersion of the PE-containing polyolefin powder by step (1), and increases the crystallinity of the obtained polyolefin microporous membrane to diffuse the stress concentration points, without cutting the polymer chains by the high shear force during melt kneading and impairing the higher-order structure of the PE, as occurs in the prior art.

Furthermore, since a homogeneous mixed slurry of the PE-containing polyolefin powder and plasticizer can be supplied to the extrusion step according to the third embodiment, the handleability may be superior compared to homogeneous dispersion after the resin powder and liquid have been separately supplied to the extruder.

The steps of the method for producing a polyolefin microporous membrane according to the third embodiment will now be described. Known conditions and methods may be employed for each step, unless otherwise specified.

[(1) Mixed Slurry Producing Step]

In step (1), a polyethylene (PE)-containing polyolefin powder and a plasticizer are mixed with a continuous mixer under conditions with a temperature of 20° C. to 70° C., a shear rate of 100 seconds$^{-1}$ to 400,000 seconds$^{-1}$ and a residence time of 1.0 seconds to 60 seconds, to obtain a mixed slurry. From the viewpoint of increasing the quality and strength of the obtained polyolefin microporous membrane in step (1), it is preferred to use ultrahigh molecular weight polyethylene (UHMWPE) as the PE starting material.

When in the presence of a plasticizer, internal heat release or external heating of the UHMWPE powder starting material causes the crystalline-amorphous ratio of the UHMWPE to change while its overall mobility gradually increases, thus allowing the plasticizer to soak into the amorphous portion of the UHMWPE powder, or into the intermediate layers between the crystalline and amorphous portions. At this stage there is no fusing or melting of the resin powder, and the phenomenon is referred to as swelling of the plasticizer. Before loading into the extruder in the extrusion step (2), the UHMWPE powder is caused to swell to a predetermined level in step (1), so that excessive shear is not applied to the UHMWPE during the extrusion step (2) and a homogeneous molten resin composition can be obtained. In conventional methods that do not include the mixed slurry producing step (1), fusion or melting of the UHMWPE powder surface proceeds while the UHMWPE powder is being fed into the extruder, thereby inhibiting swelling inside the extruder and causing significant generation of non-molten or gelled matter.

Solid viscoelasticity measurement of a compressed UHMWPE powder resin product shows a broad peak for the storage modulus (F) at 0° C. to 120° C. which is known as crystal relaxation, and it corresponds to sliding at the grain boundary ($\alpha_1$) or elastic changes in the crystal itself ($\alpha_2$) (where the corresponding temperatures T are $T_{\alpha2}>T_{\alpha1}$). UHMWPE powder is generally known to have $T_{\alpha2}$ of about 100° C. despite variation or changes depending on the molecular weight, molecular weight distribution or density, and within the storage modulus (F), a large peak for $\alpha_1$ is observed near 60° C. Relaxation of $\alpha_2$ is observed from about 70° C. to near 100° C. In order to cause maximum swelling of the UHMWPE powder without melting, therefore, a sliding state can be selectively created at the grain boundaries without causing elastic changes in the crystals themselves at 70° C. to 100° C., promoting swelling of the plasticizer into the amorphous portions or the intermediate layer between the crystalline and amorphous portions. At a temperature of 70° C. or higher, the crystals gradually fuse and inhibit swelling.

From the viewpoint of causing maximum swelling of PE powder, therefore, the lower limit for the preset temperature of the continuous mixer is 20° C. or higher, preferably 25° C. or higher and more preferably 30° C. or higher, while from the viewpoint of inhibiting melting of the UHMWPE during mixing to obtain a slurry, the upper limit is 70° C. or lower, preferably 68° C. or lower and more preferably 67° C. or lower, 66° C. or lower or 65° C. or lower.

From the viewpoint of uniformly contacting the PE-containing polyolefin powder with the plasticizer to obtain a dispersion, the shear rate of the continuous mixer is 100 $seconds^{-1}$ to 400,000 $seconds^{-1}$, preferably 120 $seconds^{-1}$ to 398,000 $seconds^{-1}$ and more preferably 1,000 $seconds^{-1}$ to 100,000 $seconds^{-1}$.

From the viewpoint of ensuring dispersion of the PE in the plasticizer, the residence time of the continuous mixer is 1.0 seconds to 60 seconds, preferably 2.0 seconds to 58 seconds and more preferably 2.0 seconds to 56 seconds.

The ultrahigh molecular weight polyethylene (UHMWPE) to be used for the third embodiment may be the UHMWPE described for the first or second embodiment.

Either the same or different types of UHMWPE may be used for the third embodiment as well. From the viewpoint of high strength as a polyolefin microporous membrane, the UHMWPE is preferably poly(ethylene and/or propylene-co-α-olefin), and more preferably one or more selected from the group consisting of poly(ethylene-co-propylene), poly(ethylene-co-butene) and poly(ethylene-co-propylene-co-butene). From the same viewpoint, the UHMWPE preferably includes an ethylene-derived structural unit at 98.5 mol % to 100 mol %, and more preferably it includes a structural unit derived from an α-olefin other than ethylene at greater than 0.0 mol % and 1.5 mol % or less.

From the viewpoint of the strength of the obtained polyolefin microporous membrane, the content of the polyolefin powder in the mixed slurry based on the weight of the mixed slurry is preferably greater than 0 weight %, more preferably 1 weight % or greater and even more preferably 2 weight % or greater or 4 weight % or greater, while from the viewpoint of inhibiting generation of unmelted gel of the polyolefin powder, the content is preferably 50 weight % or lower, more preferably 40 weight % or lower and even more preferably 30 weight % or lower or weight % or lower.

From the viewpoint of the strength of the obtained polyolefin microporous membrane, the content of the PE or UHMWPE in the polyolefin powder based on the weight of the polyolefin powder is preferably 2 weight % or greater and more preferably 4 weight % or greater, while from the viewpoint of inhibiting generation of unmelted gel of the PE or UHMWPE, the content is preferably 90 weight % or lower and more preferably 88 weight % or lower.

The plasticizer used in step (1) may be any known material that is liquid at temperatures of 20° C. to 70° C. and has excellent dispersibility for PE. In consideration of the extraction step (5) as well, the plasticizer used in step (1) is preferably a non-volatile solvent that can form a homogeneous solution at or above the melting point of the polyolefin. Specific examples of such non-volatile solvents include hydrocarbons such as liquid paraffin, paraffin wax, decane and decalin; esters such as dioctyl phthalate and dibutyl phthalate; and higher alcohols such as oleyl alcohol and stearyl alcohol, with liquid paraffin being preferable among these. Liquid paraffins are preferred among these because of their high compatibility with polyethylene or polypropylene and low risk of interfacial peeling between the resin and plasticizer even when the melt kneaded mixture is stretched, tending to allow homogeneous stretching.

Optionally, the mixed slurry may include polyethylene other than UHMWPE, a polyolefin other than polyethylene, a resin other than a polyolefin, and various additives. The polyolefin powder may also optionally include polyethylene other than UHMWPE and/or a polyolefin other than polyethylene.

Examples of polyethylene other than UHMWPE include high-density polyethylene (HDPE), linear low-density polyethylene (LLDPE), high-pressure low-density polyethylene, and mixtures of the same. Polyethylene with a narrow molecular weight distribution, obtained using a metallocene catalyst, and HDPE obtained by multistage polymerization, may also be used. Such polyethylene types may be used alone or in combinations, to constitute the remaining portion of a polyolefin microporous membrane that includes UHMWPE.

Examples of polyolefins other than polyethylene include polypropylene, polybutene, ethylene-propylene copolymer, polymethylpentene and silane graft-modified polyolefins. Such polyolefin types may be used alone or in combinations, to constitute the remaining portion of a polyolefin microporous membrane that includes UHMWPE.

Examples of resins other than polyolefins include engineering plastic resins such as polyphenylene ethers; polyamide resins such as nylon 6, nylon 6-12 and aramid resins; polyimide-based resins; polyester-based resins such as polyethylene terephthalate (PET) and polybutene terephthalate (PBT); polycarbonate-based resins; fluorine-based resins such as polyvinylidene fluoride (PVDF) and polytetrafluoroethylene; copolymers of ethylene and vinyl alcohol, copolymers of $C_2$-$C_{12}$ α-olefins and carbon monoxide, and their hydrogenated forms; hydrogenated styrene-based copolymers; copolymers of styrene and α-olefins, and their hydrogenated forms; copolymers of styrene and aliphatic monounsaturated fatty acids; polymers of (meth)acrylic acid, (meth)acrylate and/or their derivatives; thermoplastic resins selected from among copolymers of styrene and conjugated diene-based unsaturated monomers, and their hydrogenated forms; and polysulfones, polyethersulfones and polyketones. Such resins may be used alone or in combinations, to constitute the remaining portion of a polyolefin microporous membrane that includes UHMWPE.

The mixed slurry may also include publicly known additives, including dehydrating condensation catalysts, metal soaps such as calcium stearate or zinc stearate, or ultraviolet absorbers, light stabilizers, antistatic agents, anti-fogging agents or color pigments, for example.

[(2) Extrusion Step]

In step (2), the mixed slurry is loaded into a twin-screw extruder and extruded to obtain a resin composition.

In step (2), the mixed slurry is preferably fed into the twin-screw extruder at a temperature of 25° C. to 80° C. to produce the resin composition. The feed temperature is preferably adjusted to a range of 25° C. to 80° C. from the viewpoint of ensuring a suitable viscosity for the mixed slurry while also ensuring entanglement of the polymer chains to a degree that the molecular weight of the PE in the polyolefin powder is not reduced. From the same viewpoint, the feed temperature is more preferably 30° C. to 76° C. and even more preferably 30° C. to 70° C.

Since homogeneous dispersion of the PE is ensured by the mixed slurry producing step (1) for the third embodiment, the extrusion step (2) is not limited by the conditions such as the type of twin-screw extruder, supply of the slurry to the twin-screw extruder, the extrusion time, the extrusion speed, the shear rate and the shear force, so long as control of the feed temperature and extrusion temperature are in the ranges specified above.

Swelling, melting and/or kneading of the PE-containing polyolefin powder is preferred from the viewpoint of inhibiting generation of unmelted gel or reduced molecular weight of the resin composition in the twin-screw extruder. For example, the melt kneading method may be a method of loading the mixed slurry into a twin-screw extruder and hot melting the resin components such as the PE-containing polyolefin powder, and kneading them with the plasticizer.

Optionally, polyethylene other than UHMWPE, a polyolefin other than polyethylene, a resin other than a polyolefin or various additives may also be supplied to the twin-screw extruder during extrusion of the mixed slurry. The polyethylene other than UHMWPE, polyolefin other than polyethylene, resin other than a polyolefin and additives described for the mixed slurry producing step (1) may be loaded into the twin-screw extruder for the extrusion step (2).

[(3) Sheet-Forming Step]

In the sheet-forming step (3), the resin composition obtained in step (2) is extruded into a sheet form and cooled to solidification to form a cast sheet. The resin composition may also include an UHMWPE-containing polyolefin resin and a plasticizer.

From the viewpoint of sheet formability, the proportion of polyolefin resin in the cast sheet is preferably 10 weight % to 80 weight %, more preferably 20 weight % to 60 weight % and most preferably 30 weight % to 50 weight %, based on the weight of the cast sheet.

The method of producing the cast sheet may be, for example, a method of extruding the resin composition obtained from step (2) through a T-die into a sheet, and contacting it with a heat conductor to cool it to a lower temperature than the crystallization temperature of the resin component, thereby solidifying it. The heat conductor used for cooling solidification may be a metal, water, air or a plasticizer. Metal rolls are preferably used for high heat conduction efficiency. When the extruded resin composition is to be contacted with metal rolls, it is also preferably sandwiched between the rolls because this will further increase the heat conduction efficiency while causing the sheet to become oriented and increasing the membrane strength, and also tending to improve the surface smoothness of the sheet. The die lip gap when extruding the resin composition into a sheet from a T-die is preferably from 200 μm to 3,000 μm and more preferably from 500 μm to 2,500 μm. Limiting the die lip gap to 200 μm or greater can reduce tip adhesion, can lower the effects of streaks and defects on the membrane quality, and can lower the risk of membrane rupture during the subsequent stretching step. Limiting the die lip gap to 3,000 μm or smaller, on the other hand, can speed the cooling rate to prevent cooling irregularities while maintaining sheet thickness stability.

The extruded cast sheet may also be rolled in step (3).

[(4) Stretching Step]

In step (4), the cast sheet obtained in step (3) is biaxially stretched to an area increase factor of 20 to 200 to obtain a stretched sheet.

The stretching treatment is preferably biaxial stretching rather than uniaxial stretching from the viewpoint of helping to lower the membrane thickness distribution and air permeability distribution in the transverse direction. Simultaneously stretching the sheet in biaxial directions will reduce the cooling and heating frequency of the cast sheet during the membrane formation step, and will improve the distribution in the transverse direction. Examples of biaxial stretching methods include simultaneous biaxial stretching, sequential biaxial stretching, multistage stretching and repeated stretching. Simultaneous biaxial stretching is preferred from the viewpoint of obtaining increased puncture strength and stretching uniformity, while successive biaxial stretching is preferred from the viewpoint of easier control of the plane orientation.

For the purpose of the present specification, simultaneous biaxial stretching is a stretching method in which stretching in the MD (the machine direction during continuous casting of the microporous membrane) and stretching in the TD (the direction crossing the MD of the microporous membrane at a 90° angle) are carried out simultaneously, and in such a case the stretch ratios in each direction may be different. Sequential biaxial stretching is a stretching method in which stretching in the MD and TD are carried out independently, in such a manner that when the MD or TD stretching is being carried out, the other direction is in a non-constrained state or in an anchored state with fixed length.

The stretch ratio is an area increase by a factor of preferably in the range of 20 to 200, more preferably in the range of 25 to 170 and even more preferably in the range of 30 to 150. The stretch ratio in each axial direction is preferably in the range of 2 to 15 in the MD and 2 to in the TD, more preferably in the range of 3 to 12 in the MD and 3 to 12 in the TD, and even more preferably in the range of 5 to 10 in the MD and 5 to 10 in the TD. If the total area factor is or greater the obtained microporous membrane will tend to be imparted with sufficient strength, and if the total area factor is 200 or lower, membrane rupture will tend to be prevented in step (4), resulting in high productivity.

The stretching temperature is preferably 90° C. to 150° C., more preferably 100° C. to 140° C. and even more preferably 110° C. to 130° C. from the viewpoint of the melting property and membrane formability of the polyolefin resin.

[(5) Extraction Step]

In step (5), the plasticizer is extracted and removed from the stretched sheet obtained in step (4) to obtain a porous body. The method of extracting the plasticizer may be, for example, a method of immersing the stretched sheet in an extraction solvent to extract the plasticizer, and then drying it. The extraction method may be either a batch process or a continuous process. In order to minimize contraction of the porous body, it is preferred to constrain the edges of the cast sheet during the series of steps of immersion and drying. The plasticizer residue in the porous body is preferably less than 1 weight % of the total weight of the porous membrane.

The plasticizer may be collected by a process such as distillation after the extraction step (5) and reutilized.

The extraction solvent used is preferably one that is a poor solvent for the polyolefin resin and a good solvent for the plasticizer, and that has a boiling point that is lower than the melting point of the polyolefin resin. Examples of such extraction solvents include hydrocarbons such as n-hexane and cyclohexane; halogenated hydrocarbons such as methylene chloride and 1,1,1-trichloroethane; non-chlorine-based halogenated solvents such as hydrofluoroethers and hydrofluorocarbons; alcohols such as ethanol and isopropanol; ethers such as diethyl ether and tetrahydrofuran; and ketones such as acetone and methyl ethyl ketone. These extraction solvents may be collected by a process such as distillation and then reutilized.

[(6) Heat Treatment Step]

In step (6), the porous body is subjected to heat treatment at a temperature below the melting point of the porous body in order to reduce shrinkage and for heat setting, and the porous body is stretched to obtain a microporous membrane.

The porous body is heat treated for heat setting from the viewpoint of inhibiting shrinkage. The method of heat treatment may include a stretching operation carried out with a predetermined atmosphere, a predetermined temperature and a predetermined stretch ratio to adjust the physical properties, and/or relaxation with a predetermined atmosphere, a predetermined temperature and a predetermined relaxation factor to reduce the stretching stress. The relaxation operation may also be carried out after the stretching operation. Such heat treatment can be carried out using a tenter or roll stretcher.

From the viewpoint of increasing the strength and porosity of the microporous membrane, the stretching operation is preferably stretching to a factor of 1.1 or greater and more preferably to a factor of 1.2 or greater in the MD and/or TD of the membrane.

The relaxation is a contraction operation in the MD and/or TD of the membrane. The relaxation factor is the value of the dimension of the membrane after the relaxation divided by the dimension of the membrane before the relaxation. When relaxation is in both the MD and TD, it is the value of the relaxation factor in the MD multiplied by the relaxation factor in the TD. The relaxation factor is also preferably 1.0 or lower, more preferably 0.97 or lower and even more preferably 0.95 or lower. The relaxation factor is preferably 0.5 or higher from the viewpoint of membrane quality. Relaxation may be in both the MD and TD, or in only either of the MD or TD.

The temperature for heat treatment including stretching and relaxation is preferably in the range of 100° C. to 170° C. from the viewpoint of the melting point (hereunder also referred to as "Tm") of the polyolefin resin. The temperature for stretching and relaxation is preferably within this range from the viewpoint of balance between heat shrinkage factor reduction and porosity. The lower limit for the heat treatment temperature is more preferably 110° C. or higher, even more preferably 120° C. or higher and yet more preferably 125° C. or higher, and the upper limit is more preferably no higher than 160° C., even more preferably no higher than 150° C. and yet more preferably no higher than 140° C.

During or after step (6), the microporous membrane may be subjected to post-treatment such as hydrophilicizing treatment with a surfactant or the like, or to crosslinking treatment with ionizing radiation. The order of steps (4), (5) and (6) described above may be altered or the steps may be carried out simultaneously, but from the viewpoint of membrane formability the steps are preferably carried out in the order: step (4), (5), (6), using a biaxial stretching machine.

From the viewpoint of handleability and storage stability, the obtained microporous membrane may be wound up with a winder, or used to form a roll, or cut with a slitter.

Carrying out the method according to the third embodiment can also produce a polyolefin microporous membrane of the second embodiment.

<Method for Producing Separator for Electricity Storage Device>

A polyolefin microporous membrane according to the second or third embodiment can be used to produce a separator for an electricity storage device according to the first embodiment. The polyolefin microporous membrane may be used as a flat membrane to form a single-layer separator. A plurality of polyolefin microporous membranes may also be stacked, and/or a polyolefin microporous membrane may be stacked with other membranes or layers, to form a laminated membrane separator. By coating the polyolefin microporous membrane with a coating material it is possible to form a coating membrane separator.

<Electricity Storage Device>

The separator of the first embodiment, or a separator comprising a polyolefin microporous membrane according to the second or third embodiment, can be used in an electricity storage device. An electricity storage device comprises a positive electrode, a negative electrode, a separator disposed between the positive and negative electrodes, and an electrolyte solution. Specifically, the electricity storage device may be a lithium battery, lithium secondary battery, lithium ion secondary battery, sodium secondary battery, sodium ion secondary battery, magnesium secondary battery, magnesium ion secondary battery, calcium secondary battery, calcium ion secondary battery, aluminum secondary battery, aluminum ion secondary battery, nickel hydrogen battery, nickel cadmium battery, electrical double layer capacitor, lithium ion capacitor, redox flow battery, lithium sulfur battery, lithium-air battery or zinc air battery, for example. Preferred among these, from the viewpoint of practicality, is a lithium battery, lithium secondary battery, lithium ion secondary battery, nickel hydrogen battery or lithium ion capacitor, with a lithium battery or lithium ion secondary battery being more preferred.

<Lithium Ion Secondary Battery>

A lithium ion secondary battery is a battery employing a lithium transition metal oxide such as lithium cobaltate or a lithium cobalt composite oxide as the positive electrode, a carbon material such as graphite as the negative electrode, and an organic solvent containing a lithium salt such as $LiPF_6$ as the electrolyte solution. During charge and discharge of the lithium ion secondary battery, ionized lithium reciprocates between the electrodes. The separator is disposed between the electrodes because the ionized lithium must migrate between the electrodes relatively rapidly while contact between the electrodes is inhibited.

EXAMPLES

The embodiment will now be described in detail by examples and comparative examples, with the understanding that there is no limitation to the examples so long as the gist of this embodiment is not exceeded. The physical properties in the examples and comparative examples were measured by the following methods.

<Weight-Average Molecular Weight (Mw) and Number-Average Molecular Weight (Mn)>

Standard polystyrene was measured using a Model ALC/GPC 150C™ by Waters Co. under the following conditions, and a calibration curve was drawn. The chromatogram for each polymer was also measured under the same conditions, and the weight-average molecular weight and number-average molecular weight of each polymer was calculated by the following method, based on the calibration curve.

Column: $GMH_6$-HT™ (2)+$GMH_6$-HTL™ (2), by Tosoh Corp.

Mobile phase: o-Dichlorobenzene

Detector: Differential refractometer

Flow rate: 1.0 ml/min

Column temperature: 140° C.

Sample concentration: 0.1 wt %

(Weight-Average Molecular Weight and Number-Average Molecular Weight of Polyethylene)

Each molecular weight component in the obtained calibration curve was multiplied by 0.43 (polyethylene Q factor/polystyrene Q factor=17.7/41.3), to obtain a molecular weight distribution curve in terms of polyethylene, and the weight-average molecular weight and number-average molecular weight were calculated.

<Viscosity-Average Molecular Weight (Mv)>

The limiting viscosity [1] (dl/g) at 135° C. in a decalin solvent was determined based on ASTM-D4020. The Mv of polyethylene was calculated by the following formula.

$$[\eta] = 6.77\times10^{-4}Mv^{0.67}$$

The Mv of polypropylene was calculated by the following formula.

$$[\eta] = 1.10\times10^{-4}Mv^{0.80}$$

<Melting Point (° C.)>

The melting point of the polyolefin resin was measured using a "DSC-60" differential scanning calorimetry (DSC) measuring apparatus (product of Shimadzu Corp.).

<Thickness of Each Layer (μm)>

A micro thickness gauge by Toyo Seiki Co., Ltd. (type KBN, terminal diameter: 05 mm) was used to measure the membrane thickness at an atmosphere temperature of 23±2° C. For thickness measurement, 10 microporous membranes were stacked and measured and the value of the total thickness divided by 10 was recorded as the single thickness.

<Porosity (%)>

A 10 cm×10 cm-square sample was cut out from the microporous membrane, and its volume ($cm^3$) and mass (g) were determined and used together with the density ($g/cm^3$) by the following formula, to obtain the porosity. The density value used for the mixed composition was the value determined by calculation from the densities of the starting materials used and their mixing ratio.

$$\text{Porosity (\%)} = (\text{Volume} - (\text{mass}/\text{density of mixed composition}))/\text{volume}\times100$$

<Air Permeability (sec/100 $cm^3$)>

The air permeability of the sample was measured with a Gurley air permeability tester (G-B2™ by Toyo Seiki Kogyo Co., Ltd.), according to JIS P-8117(2009).

<(110) Crystallite Size and Degree of Crystallinity>

(Measurement)

An Ultima-IV X-ray diffraction apparatus by Rigaku Corp. was used for XRD measurement. Cu-Kα rays were directed onto the sample and the diffracted light was detected using a D/tex Ultra Detector by Rigaku Corp. KRD measurement was performed under conditions with a sample/detector distance of 285 mm, an excitation voltage of 40 kV and a current of 40 mA. A centralized optic system was used as the optical system, and measurement was performed under slit conditions of DS=½°, SS=release, vertical slit=10 mm.

(Analysis)

The range from 2θ=9.7° to 2θ=29.0° in the obtained XRD profile was separated into three parts: an orthorhombic (110) plane diffraction peak, an orthorhombic (200) plane diffraction peak and an amorphous peak, and the crystallite size was calculated according to the Scherrer equation (Formula 1), based on the full width at half maximum of the (110) plane diffraction peak. The (110) plane diffraction peak and the (200) plane diffraction peak were approximated by the Voigt function, and the amorphous peak was approximated by the Gaussian function. The location of the amorphous peak was 2θ=19.6° and the full width at half maximum was fixed at 6.3°, while the peak locations and full widths at half maximum of the crystalline peaks were separate without being fixed. The crystallite size was calculated according to the Scherrer equation (Formula 1), based on the full width at half maximum of the (110) plane diffraction peak calculated by peak separation.

$$D(110) = K\lambda/(\beta\cos\theta) \qquad \text{Formula 1}$$

Explanation of symbols in Formula 1:

D (110): Crystallite size (nm)

K: 0.9 (Constant)

λ: X-ray wavelength (nm)

β: $(\beta_1^2-\beta_2^2)^{0.5}$ $\beta_1$: Full width at half maximum of (hkl) peak calculated after peak separation (rad)

$\beta_2$: Full width at half maximum of incident beam (rad)

θ: Bragg angle

When necessary, the area I (110) of the (110) plane diffraction peak and the area I (200) of the (200) plane diffraction peak obtained by the analysis were used for calculation of the area ratio R according to the following formula.

$$\text{Area ratio } R = I(110)/\{I(110)+I(200)\}$$

The degree of crystallinity (X) was calculated by the following formula.

$$\text{Degree of crystallinity } X = \{I(110)+I(200)\}/\{I(110)+I(200)+Iamr\}$$

Iamr: Area of amorphous peak

<Cross-Sectional Orientation>

(Measurement)

A NANO-Viewer X-ray structure evaluator by Rigaku Corp. was used for wide-angle X-ray scattering measurement by the transmission method. CuKα rays were irradiated onto the sample and scattering was detected with an imaging plate. Wide-angle X-ray scattering measurement was performed under conditions with a sample/detector distance of 95.2 mm and an output of 60 kV, 45 mA. A point focus was used as the optical system, and the measurement was performed with the following slit diameters: 1st slit: φ=0.4 mm, 2nd slit: φ=0.2 mm. The sample was set with an angle of 10.5° between the sample surface and the direction of X-ray incidence.

(Analysis)

Of the normal directions to the sample surface, the direction toward the upstream end projected onto the detector was defined as declination φ=0°, and declinations were defined for φ=−180° to φ=180° in a clockwise manner on the detector surface. Detector background correction and empty cell scatter correction were then carried out for the X-ray scattering pattern obtained from the imaging plate. Next, the integrated intensity I (φ) in the range of 19.5°<2θ<21.3° in which the (110) plane diffraction peak for polyethylene was present for each declination angle φ, was plotted in a declination range of −45°<φ<45° with respect to the declination angle φ. When the molecular chains were oriented parallel to the membrane surface in the cross-section, I (φ) was a single peak centered on φ=0°. The curve was fitted by addition of the constant and Gaussian function according to Formula 2, and the cross-sectional orientation f was calculated according to Formula 3 from the full width at half maximum of the Gaussian function for the fitted result.

$$I(\Phi) = A + B * \exp\left(-((\varphi - \varphi 0)/w)^2\right) \quad \text{Formula 2}$$

Explanation of symbols in Formula 2:

I (φ): Integrated intensity in range of 19.5°<2θ<21.3° for declination angle (p after background correction and empty cell scattering correction φ: Declination angle (rad)

$$f = 1 - FWHM/180 \quad \text{Formula 3}$$

Explanation of symbols in Formula 3:

f: Cross-sectional orientation

FWHM: Full width at half maximum)(° for Gaussian function obtained from fitting result <Pore Diameter>

(Measurement)

A NANO-Viewer X-ray structure evaluator by Rigaku Corp. was used for small angle X-ray scattering measurement by the transmission method. CuKα rays were irradiated onto the sample and the scattering was detected with a semiconductor detector PILATUS by Dectris Co. Measurement was performed under conditions with a sample/detector distance of 841.5 mm and an output of 60 kV, 45 mA. A point focus was used as the optical system, and the measurement was performed with the following slit diameters: 1st slit: φ=0.4 mm, 2nd slit: φ=0.2 mm, guard slit: φ=0.8 mm. The sample was set so that the sample surface and the direction of X-ray incidence were perpendicular.

(Analysis)

Absolute intensity correction of the detector was carried out for the X-ray scattering pattern obtained from the PILATUS, and a SAXS profile I (q) was obtained by circular average. The range of 0.33 $nm^{-1}$<q<1.04 $nm^{-1}$ for the obtained one-dimensional profile I (q) was fitted by Porod's law shown in Formula 4, and the specific surface area S per 1 $nm^3$ was obtained. Next, assuming the shapes of the membrane pores to be spherical, the pore diameter d was determined by Formula 5 based on the specific surface area S and the porosity P.

$$I(q) = 2\pi\Delta\rho e^2 Sq^{-4} \quad \text{Formula 4}$$

Explanation of symbols in Formula 4:

I(q): Absolute intensity-corrected SAXS profile ($e^2/nm^3$)

Q: Scattering vector absolute value ($nm^{-1}$)

$\Delta\rho_e$: Electron density difference between air and membrane ($e/nm^3$)

S: Specific surface area ($nm^2$) per 1 $nm^3$ $$d = 3P/50S \quad \text{Formula 5}$$

Explanation of symbols in Formula 5:

d: Pore diameter (nm)

P: Porosity (%)

S: Specific surface area ($nm^2$) per 1 $nm^3$

<Puncture Strength (gf)>

Using a "KES-G5" Handy Compression Tester (trademark of Kato Tech Corp.), the puncture strength of the sample membrane was determined by a puncture test under conditions with a needle tip curvature radius of 0.5 mm and a puncture speed of 2 mm/sec.

<Tensile Breaking Strength (kgf/$cm^2$)>

A sample membrane cut to 10 mm×100 mm and a tensile tester were used for measurement of the tensile strength of the sample membrane under conditions with a load cell load of 5 kgf and a chuck distance of 50 mm.

<Quantification of Resin Aggregates in Separator>

The resin aggregates (gel content) in the separator were defined in a region with an area of 100 μm length×≥100 μm width, and with no light permeation, when separators obtained by the membrane formation steps in the Examples and Comparative Examples described below were observed with a transmission optical microscope. The number of resin aggregates per 1000 $m^2$ area of the separator were counted during observation with a transmission optical microscope.

<Quantification of Molecular Weight Degradation>

The starting mixture is measured out in a fixed amount before loading into the extruder, and the viscosity-average molecular weight measuring method described under <Viscosity-average molecular weight (Mv)> is used to measure the viscosity [η], recorded as $[\eta_0]$. The final membrane obtained from the membrane formation step is measured out in the same fixed amount and the viscosity is measured and recorded as $[\eta_a]$. The molecular weight degradation rate (%) is calculated by the following formula.

$$\text{Molecular weight degradation rate (\%)} = 100 \times [\eta_a]/[\eta_0]$$

<Compression Resistance Test>

After cutting out two separators to 10 cm×10 cm, they were stacked and the thickness was measured at 9 arbitrary points within a 8 cm×8 cm area with reference to intersecting diagonals on the top view, and the average value was calculated, after which they were covered above and below with two PET films (10 cm×10 cm) to form a laminated stack. The laminated stack was sandwiched above and below by two rubber sheets (10 cm×10 cm) each with a thickness of 5 mm, and a Mini Test Press (Model: MP-WCH) by Toyo Seiki Co., Ltd. was used to apply pressure while heating. The PET film and rubber sheet were used in such a manner that the pressure was evenly applied to the whole surface, and the uniformity was confirmed with a pressure sensor. The upper and lower heater temperature of the pressing machine was 70° C., and pressure of 8 MPa was applied and held for 3 minutes in a uniform manner on the 10 cm×10 cm sample. After the heat compression procedure, the thickness of two stacked separators was measured at 9 arbitrary points in an 8 cm×8 cm area with reference to intersecting diagonals on the top view, their average was calculated, and the difference from the thickness before compression was quantified by the following formula and recorded as the percentage thickness reduction (%).

$$\text{Percentage thickness reduction (\%)} = ((\text{Thickness after compression } (\mu m) - \text{thickness before compression } (\mu m)) / \text{thickness before compression } (\mu m)) \times 100$$

<Battery Destruction Safety Test>

The battery destruction safety test is a test in which a battery charged to 4.5 V is hit with an iron nail at a speed of 20 mm/sec and punctured to produce internal short circuiting. This test can measure time-dependent change behavior of voltage reduction of the battery due to internal short circuiting, and battery surface temperature increase behavior due to internal short circuiting, to elucidate these phenomena during internal short circuiting. An inadequate shutdown function of the separator during internal short circuiting or membrane rupture at low temperature can also result in sharp heat release of the battery, which may lead to ignition of the electrolyte solution and fuming and/or explosion of the battery.

(Fabrication of Battery to be Used in Battery Destruction Safety Test)

a. Fabrication of Positive Electrode

A slurry was prepared by dispersing 92.2 weight % of lithium cobalt composite oxide ($LiCoO_2$) as a positive electrode active material, 2.3 weight % each of flaky graphite and acetylene black as conductive materials and 3.2 weight % of polyvinylidene fluoride (PVDF) as a binder, in N-methylpyrrolidone (NMP). The slurry was coated using a die coater onto one side of a 20 μm-thick aluminum foil as the positive electrode collector, and dried at 130° C. for 3 minutes, after which it was compression molded using a roll press. During this time, the active material coating amount on the positive electrode was adjusted to 250 g/$m^2$ and the active material bulk density was adjusted to 3.00 g/$cm^3$.

b. Fabrication of Negative Electrode

A slurry was prepared by dispersing 96.9 weight % of artificial graphite as a negative electrode active material, 1.4 weight % of carboxymethyl cellulose ammonium salt as a binder and 1.7 weight % of styrene-butadiene copolymer latex in purified water. The slurry was coated using a die coater onto one side of a 12 μm-thick copper foil as the negative electrode collector, and dried at 120° C. for 3 minutes, after which it was compression molded using a roll press. During this time, the active material coating amount on the negative electrode was adjusted to 106 g/$m^2$ and the active material bulk density was adjusted to 1.35 g/$cm^3$.

c. Preparation of Non-Aqueous Electrolyte Solution

This was prepared by dissolving 1.0 mol/L concentration $LiPF_6$, as a solute, in a mixed solvent of ethylene carbonate: ethyl methyl carbonate=1:2 (volume ratio).

d. Battery Assembly

A separator was cut out to 60 mm in the widthwise (TD) direction and 1000 mm in the lengthwise (MD) direction, the separator was folded in a hairpin fashion, and positive electrodes and negative electrodes were alternately stacked between the separator (12 positive electrodes, 13 negative electrodes). The positive electrodes used had areas of 30 mm×50 mm, and the negative electrodes had areas of 32 mm×52 mm. The laminated stack that had been folded in a hairpin fashion was inserted into a laminating bag, and then injected with the nonaqueous electrolyte solution obtained in c. above and sealed. After allowing it to stand at room temperature for 1 day, it was subjected to initial charge of the fabricated battery for a total of 6 hours, by a method of charging to a cell voltage of 4.2 V at a current value of 3 mA (0.5 C) in an atmosphere of 25° C. and, after reaching that voltage, beginning to draw out a current of 3 mA while maintaining 4.2 V. The battery was then discharged to a cell voltage of 3.0 V at a current value of 3 mA (0.5 C).

(Maximum Heat Release Rate)

After puncturing the obtained battery with an iron nail, the battery surface temperature was measured using a thermocouple for a period of 300 seconds and the resulting temperature change graph was used to determine the rate during which the change in temperature increase per second was greatest, as the maximum heat release rate.

(Voltage Reduction Time)

The time required for voltage reduction from 4.5 V to 3 V after puncturing the obtained battery with an iron nail was established as the voltage reduction time (3 V reduction time).

<Cycle Characteristic Evaluation and Battery Fabrication Method>

A battery for evaluation of cycle characteristics was fabricated by the same method as in a. to c. above for the method of fabricating a battery used in <Battery destruction safety test>, but with the assembly described in d. below.

Charge-discharge of the obtained battery was carried out for 100 cycles in an atmosphere of 60° C. Charging was for a total of 3 hours, by a method of charging to a cell voltage of 4.2 V at a current value of 6.0 mA (1.0 C) and, after reaching that voltage, beginning to draw out a current of 6.0 mA while maintaining 4.2 V. Discharge was to a cell voltage of 3.0 V at a current value of 6.0 mA (1.0 C). The capacity retention was calculated from the service capacity at the 100th cycle and the service capacity at the first cycle. A high capacity retention was evaluated as a satisfactory cycle characteristic.

d. Battery Assembly

The separator was cut out to a circle with a diameter of 18 mm and the positive electrode and negative electrode to circles with diameters of 16 mm, and the positive electrode, separator and negative electrode were stacked in that order with the active material sides of the positive electrode and negative electrode facing each other, after which they were housed in a covered stainless steel metal container. The container and cover were insulated, with the container in contact with the negative electrode copper foil and the cover in contact with the positive electrode aluminum foil. The nonaqueous electrolyte solution obtained in c. under <(7) Battery destruction safety test> above was injected into the container, which was then sealed. After allowing it to stand at room temperature for 1 day, the fabricated battery was subjected to initial charge for a total of 6 hours, by a method of charging to a cell voltage of 4.2 V at a current value of 3 mA (0.5 C) in an atmosphere of 25° C. and, after reaching that voltage, beginning to draw out a current of 3 mA while maintaining 4.2 V. The battery was then discharged to a cell voltage of 3.0 V at a current value of 3 mA (0.5 C).

<Experiment Group I>

Membrane Formation Example

After adding 35 weight % of ultrahigh molecular weight polyethylene homopolymer (UHMWPE, weight-average molecular weight and number-average molecular weight unmeasurable, viscosity-average molecular weight: 2,500,000), 60 weight % of high-density polyethylene homopolymer (HDPE, weight-average molecular weight: 130,000, number-average molecular weight: 20,000, viscosity-average molecular weight: 350,000), 5 weight % of polypropylene homopolymer (PP, weight-average molecular weight:

400,000, number-average molecular weight: 30,000, viscosity-average molecular weight: 350,000) and 1 weight % of pentaerythrityl-tetrakis-[3-(3,5-di-t-butyl-4-hydroxyphenyl) propionate] as an antioxidant with respect to the total amount of the polyolefin mixture, the components were mixed or dispersed with liquid paraffin (kinematic viscosity: $7.59\times10^{-5}$ $m^2/s$ at 37.78° C.) using a continuous mixer, to obtain a mixed slurry (to a polyethylene content of 35 weight % in the mixed slurry). The obtained mixed slurry was supplied to a twin-screw extruder using a feeder. The mixed slurry was melt kneaded in an extruder, and adjusted with a feeder and pump so that the quantity ratio of liquid paraffin in the extruded polyolefin composition was 70 weight % (i.e. a polymer concentration of 30 weight %). The melt kneading conditions were a preset temperature of 230° C., a screw rotational speed of 240 rpm and a discharge throughput of 18 kg/hr.

The melt kneaded mixture was then extrusion cast through a T-die onto a cooling roll controlled to a surface temperature of 25° C., to obtain a gel sheet with a raw membrane thickness of 1400 μm.

The gel sheet was then simultaneously fed into a biaxial tenter stretching machine for biaxial stretching. The stretching conditions were an MD factor of 7.0, a TD factor of 6.0 (i.e. a factor of 7×6), and a biaxial stretching temperature of 125° C.

The stretched gel sheet was subsequently fed into a methyl ethyl ketone tank and thoroughly immersed in the methyl ethyl ketone for extraction removal of the liquid paraffin, after which the methyl ethyl ketone was dried off.

It was then fed to a TD tenter for heat setting, and HS was carried out at a heat setting temperature of 125° C. and a stretch ratio of 1.8, after which relaxation was carried out to a factor of 0.5 in the TD direction (i.e. the HS relaxation factor was 0.5). The obtained microporous membrane was then cut at the edges and wound up as a mother roll with a width of 1,100 mm and a length of 5,000 m.

Examples I-1 to I-23 and Comparative Examples I-1 to I-12

The Membrane Formation Examples described above were modified with different resin compositions in the starting materials, different starting material feed methods and different XRD, WAXD and SAXS profiles, as shown in Tables 1 to 3, to obtain microporous membranes. The obtained microporous membranes were subjected to each evaluation by the evaluation methods described above, and the evaluation results are shown in Tables 1 to 3.

FIG. 1 shows the relationship between the diffraction angle and diffraction intensity in X-ray diffraction (XRD) for the (110) plane of the polyolefin microporous membrane obtained in Example I-1.

TABLE 1

| | | | | Example I | | | | | | | | | |
|---|---|---|---|---|---|---|---|---|---|---|---|---|---|
| | | | | 1 | 2 | 3 | 4 | 5 | 6 | 7 | 8 | 9 | 10 |
| Starting material (parts by weight) | | UHMWPE | | 35 | 35 | 35 | 35 | 35 | 35 | 35 | 35 | 35 | 35 |
| | Other polyolefin | HDPE | | 60 | 65 | 65 | 65 | 65 | 65 | 65 | 65 | 65 | 65 |
| | | PP | | 5 | 0 | 0 | 0 | 0 | 0 | 0 | 0 | 0 | 0 |
| | | Liquid paraffin | | 70 | 70 | 70 | 70 | 70 | 70 | 70 | 70 | 70 | 70 |
| | | Starting feed | | Mixed slurry | Mixed slurry | Mixed slurry | Mixed slurry | Mixed slurry | Mixed slurry | Mixed slurry | Mixed slurry | Mixed slurry | Mixed slurry |
| Micro-porous membrane | XRD | PE crystallinity | (%) | 90 | 96 | 82 | 90 | 91 | 93 | 92 | 89 | 90 | 92 |
| | | PE crystallite size | (nm) | 29.1 | 14.3 | 39.8 | 20 | 19 | 20 | 19 | 20.3 | 18 | 18.6 |
| | | Area ratio R = I (110)/[I (110) + I (200)] | | 0.62 | 0.61 | 0.63 | 0.7 | 0.7 | 0.54 | 0.6 | 0.48 | 0.51 | 0.57 |
| | WAXD | Cross-sectional crystal orientation | | 0.89 | 0.9 | 0.91 | 0.75 | 0.81 | 0.97 | 1.0 | 0.87 | 0.87 | 0.89 |
| | SAXS | Average equivalent pore diameter | (nm) | 130 | 150 | 145 | 135 | 157 | 131 | 130 | 23 | 346 | 109 |
| | | Specific surface area S | ($nm^2$) | 0.0189 | 0.0156 | 0.0157 | 0.0173 | 0.0153 | 0.0183 | 0.0175 | 0.1096 | 0.0071 | 0.0176 |
| | Membrane thickness | | (μm) | 5 | 11 | 12 | 5 | 5 | 6 | 5 | 10 | 7 | 12 |
| | Porosity | | (%) | 41 | 39 | 38 | 39 | 40 | 40 | 38 | 42 | 41 | 32 |
| | Air permeability | | (sec/100 $cm^3$) | 150 | 320 | 280 | 250 | 130 | 145 | 200 | 270 | 198 | 198 |
| | 10 μm-equivalent transmission coefficient J | | | 7.3 | 7.5 | 6.1 | 12.8 | 6.5 | 6 | 10.5 | 6.4 | 6.9 | 5.2 |
| | Strength | Puncture strength | (gf) | 480 | 999 | 1091 | 460 | 451 | 533 | 521 | 894 | 643 | 452 |
| | | MD Tensile strength | ($kgf/cm^2$) | 3500 | 3200 | 3250 | 3300 | 3700 | 3100 | 3250 | 3200 | 3300 | 3530 |
| | | TD Tensile strength | | 3800 | 3700 | 3670 | 3150 | 3150 | 3500 | 3266 | 3600 | 3750 | 3300 |
| | Quality | Gel content | (/1000 $m^2$) | 2 | 3 | 5 | 15 | 3 | 2 | 20 | 1 | 4 | 2 |
| | | Molecular weight degradation rate | (%) | 98% | 97% | 99% | 95% | 99% | 98% | 92% | 97% | 95% | 93% |
| | Compression resistance | Percentage thickness reduction | (%) | 1.3 | 1.3 | 1.2 | 39 | 38 | 1.6 | 29 | 45 | 36 | 1 |
| Battery | Destruction safety | Maximum heat release rate | (° C./sec) | 10 | 11 | 9 | 25 | 12 | 15 | 26 | 13 | 15 | 11 |
| | | Voltage reduction time | (sec) | >300 | >300 | >300 | >300 | >300 | >300 | >300 | >300 | >300 | >300 |
| | Cycle characteristic | Capacity retention | (%) | 99 | 98 | 98 | 85 | 90 | 97 | 80 | 95 | 96 | 98 |

TABLE 2

| | | | | Example I | | | | | | | | | | | | |
|---|---|---|---|---|---|---|---|---|---|---|---|---|---|---|---|---|
| | | | | 11 | 12 | 13 | 14 | 15 | 16 | 17 | 18 | 19 | 20 | 21 | 22 | 23 |
| Starting material (parts by weight) | | UHMWPE | | 35 | 35 | 35 | 35 | 1 | 4 | 7 | 68 | 71 | 92 | 35 | 35 | 35 |
| | Other polyolefin | HDPE | | 65 | 65 | 65 | 65 | 99 | 96 | 93 | 12 | 29 | 8 | 60 | 65 | 65 |
| | | PP | | 0 | 0 | 0 | 0 | 0 | 0 | 0 | 0 | 0 | 0 | 5 | 0 | 0 |
| | | Liquid paraffin | | 70 | 70 | 70 | 70 | 70 | 70 | 70 | 70 | 70 | 70 | 70 | | |
| | | Starting feed | | Mixed slurry | Mixed slurry | Mixed slurry | Mixed slurry | Mixed slurry | Mixed slurry | Mixed slurry | Mixed slurry | Mixed slurry | Mixed slurry | Mixed slurry | Mixed slurry | Mixed slurry |
| Micro-porous mem-brane | XRD | PE crystallinity | (%) | 90 | 91 | 93 | 91 | 90 | 93 | 94 | 90 | 90 | 90 | 86 | 83 | 97 |
| | | PE crystallite size | (nm) | 18 | 18.4 | 19 | 17.9 | 19 | 19.1 | 19.1 | 18.2 | 1 | 18.5 | 18.6 | 17.9 | 35.7 |
| | | Area ratio R = I (110)/[I (110) + I (200)] | | 0.55 | 0.65 | 0.63 | 0.67 | 0.55 | 0.56 | 0.54 | 0.65 | 0.67 | 0.54 | 0.53 | 0.61 | 0.65 |
| | WAXD | Cross-sectional crystal orientation | | 0.87 | 0.9 | 0.9 | 0.88 | 0.9 | 0.91 | 0.89 | 0.92 | 0.9 | 0.91 | 0.91 | 0.89 | 0.98 |
| | SAXS | Average equivalent pore diameter | (nm) | 120 | 136 | 91 | 95 | 130 | 145 | 165 | 91 | 100 | 120 | 170 | 297 | 335 |
| | | Specific surface area S | ($nm^2$) | 0.0425 | 0.0353 | 0.0211 | 0.0240 | 0.0162 | 0.0137 | 0.0138 | 0.0244 | 0.0210 | 0.0165 | 0.0134 | 0.0097 | 0.0075 |
| | | Membrane thickness | (μm) | 15 | 11 | 7 | 5 | 5 | 5 | 8 | 6 | 5 | 5 | 6 | 12 | 6 |
| | | Porosity | (%) | 85 | 80 | 32 | 38 | 35 | 33 | 38 | 37 | 35 | 33 | 38 | 48 | 42 |
| | | Air permeability | (sec/100 $cm^3$) | 55 | 60 | 310 | 285 | 150 | 145 | 186 | 165 | 140 | 150 | 170 | 97 | 125 |
| | | 10 μm-equivalent transmission coefficient J | | 0.4 | 0.7 | 13.8 | 15 | 8.6 | 8.8 | 6.1 | 7.4 | 8 | 9.1 | 7.5 | 1.7 | 5 |
| | Strength | Puncture strength | (gf) | 450 | 810 | 680 | 750 | 350 | 320 | 710 | 523 | 300 | 350 | 492 | 433 | 320 |
| | | MD Tensile strength | ($kgf/cm^2$) | 3600 | 3100 | 3300 | 3800 | 2700 | 2500 | 3500 | 3800 | 2600 | 2500 | 3100 | 2507 | 2840 |
| | | TD Tensile strength | | 3300 | 3310 | 3210 | 3200 | 2500 | 2650 | 3100 | 3600 | 2300 | 2450 | 3150 | 2900 | 3000 |
| | Quality | Gel content | (/1000 $m^2$) | 11 | 3 | 5 | 12 | 25 | 18 | 2 | 2 | 20 | 25 | 1 | 7 | 9 |
| | | Molecular weight degradation rate | (%) | 85% | 95% | 96% | 88% | 90% | 88% | 95% | 97% | 89% | 90% | 91% | 83% | 88% |
| | Compression resistance | Percentage thickness reduction | (%) | 23 | 3.4 | 1.5 | 2.8 | 3.1 | 3.3 | 2.6 | 3.5 | 3.6 | 4 | 3.8 | 16 | 4.9 |
| Battery | Destruction safety | Maximum heat release rate | (° C./sec) | 21 | 16 | 3 | 22 | 35 | 25 | 18 | 21 | 25 | 40 | 15 | 17 | 14 |
| | | Voltage reduction time | (sec) | >300 | >300 | >300 | >300 | 290 | >300 | >300 | >300 | >300 | 268 | >300 | 300 | 300 |
| | Cycle characteristic | Capacity retention | (%) | 88 | 97 | 98 | 78 | 78 | 85 | 90 | 96 | 86 | 70 | 89 | 72 | 74 |

TABLE 3

| | | | | Comparative Example I | | | | | | | | | | | |
|---|---|---|---|---|---|---|---|---|---|---|---|---|---|---|---|
| | | | | 1 | 2 | 3 | 4 | 5 | 6 | 7 | 8 | 9 | 10 | 11 | 12 |
| Starting material (parts by weight) | | UHMWPE | | 35 | 35 | 35 | 35 | 35 | 35 | 35 | 35 | 35 | 3 | 75 | 75 |
| | Other polyolefin | HDPE | | 65 | 65 | 65 | 65 | 65 | 65 | 65 | 65 | 65 | 97 | 25 | 0 |
| | | PP | | 0 | 0 | 0 | 0 | 0 | 0 | 0 | 0 | 0 | 0 | 0 | 25 |
| | | Liquid paraffin | | 70 | 70 | 70 | 70 | 70 | 70 | 70 | 70 | 70 | 70 | 70 | 70 |
| | | Starting feed | | Powder | Powder | Powder | Powder | Powder | Powder | Powder | Powder | Powder | Powder | Powder | Powder |
| Micro-porous mem-brane | XRD | PE crystallinity | (%) | 72 | 73 | 99.5 | 91 | 92 | 78 | 76 | 78 | 78 | 32 | 76 | 66 |
| | | PE crystallite size | (nm) | 11 | 19 | 20 | 13.7 | 41 | 15.6 | 15.7 | 16.3 | 19.8 | 40.2 | 15.4 | 39.7 |
| | | Area ratio R = I (110)/[I (110) + I (200)] | | 0.72 | 0.92 | 0.65 | 0.63 | 0,62 | 0.6 | 0.53 | 0.47 | 0.54 | 0.62 | 0.56 | 0.51 |
| | WAXD | Cross-sectional crystal orientation | | 0.68 | 0.75 | 0.99 | 0.83 | 0.85 | 0.82 | 0.81 | 0.81 | 0.8 | 0.73 | 0.71 | 0.64 |
| | SAXS | Average equivalent pore diameter | (nm) | 405 | 56 | 61 | 18 | 363 | 306 | 23 | 347 | 14 | 470 | 113 | 320 |
| | | Specific surface area S | ($nm^2$) | 0.0046 | 0.0396 | 0.0403 | 0.1433 | 0.0064 | 0.0157 | 0.0835 | 0.0145 | 0.1200 | 0.0040 | 0.0356 | 0.0043 |
| | | Membrane thickness | (μm) | 6.2 | 6 | 6.1 | 5.6 | 5.9 | 5 | 5.6 | 12 | 12.6 | 5.3 | 6.2 | 6.1 |
| | | Porosity | (%) | 31 | 37 | 4. | 43 | 39 | 80 | 32 | 84 | 28 | 31 | 67 | 23 |
| | | Air permeability | (sec/100 $cm^3$) | 299 | 210 | 190 | 322 | 183 | 15 | 275 | 41 | 498 | 181 | 530 | 231 |
| | | 10 μm-equivalent transmission coefficient J | | 15.6 | 9.5 | 7.6 | 13.4 | 8 | 0.4 | 15.3 | 0.4 | 14.1 | 11 | 12.8 | 16.5 |
| | Strength | Puncture strength | (gf) | 176 | 190 | 195 | 222 | 130 | 170 | 253 | 400 | 610 | 120 | 146 | 162 |
| | | MD Tensile strength | ($kgf/cm^2$) | 1110 | 1300 | 1200 | 1400 | 680 | 1200 | 1700 | 1300 | 1800 | 800 | 995 | 1100 |
| | | TD Tensile strength | | 850 | 1100 | 1250 | 1670 | 980 | 1320 | 1790 | 1300 | 1790 | 960 | 800 | 920 |
| | Quality | Gel content | (/1000 $m^2$) | 239 | 220 | 350 | 256 | 251 | 200 | 187 | 156 | 198 | 253 | 108 | 1200 |
| | | Molecular weight degradation rate | (%) | 39% | 42% | 40% | 38% | 40% | 39% | 42% | 51% | 48% | 65% | 32% | 57% |
| | Compression resistance | Percentage thickness reduction | (%) | 5 | 48 | 5.5 | 46 | 44 | 40 | 39 | 41 | 43 | 45 | 43 | 45 |
| Battery | Destruction safety | Maximum heat release rate | (° C./sec) | 73 | 65 | 51 | 530 | 65 | 320 | 43 | 200 | 45 | 106 | 52 | 75 |
| | | Voltage reduction time | (sec) | 3 | 5 | 4 | 2 | 8 | 0.7 | 12 | 2 | 18 | 1 | 5 | 2 |
| | Cycle characteristic | Capacity retention | (%) | 30 | 36 | 38 | 32 | 55 | 35 | 58 | 31 | 58 | 56 | 40 | 35 |

<Experiment Group II>

Example II-1

A continuous mixer was used for mixing of the powder shown in Table 4 (ultrahigh molecular weight polyethylene (UHMWPE) with unmeasurable weight-average molecular weight and number-average molecular weight, and viscosity-average molecular weight of 450; high-density polyethylene (other PE) with weight-average molecular weight: 126,000, number-average molecular weight: 20,000, viscosity-average molecular weight: 150,000; homopolypropylene (PP) with weight-average molecular weight: 400,000, number-average molecular weight: 30,000, viscosity-average molecular weight: 350,000) and liquid paraffin (kinematic viscosity: $7.59\times10^{-5}$ $m^2/s$ at 37.78° C.) under conditions with a shear rate of 40,000 $seconds^{-1}$ and a residence time of 20 seconds, to obtain a mixed slurry with the temperature adjusted to 65° C. The components were mixed so that the weight ratio of polyolefin powder in the mixed slurry was 35%. The abbreviation "StCa" in the tables means calcium stearate.

A feeder was used to supply the obtained mixed slurry to a twin-screw extruder comprising a manifold (T-die) having a 1500 μm die lip gap, under a nitrogen atmosphere at 60° C., and the resin composition was extruded. During this time, liquid paraffin was injected from the middle stage of extrusion so that the liquid paraffin quantity ratio was 70 weight % of the resin composition extruded from the extruder and the temperature of the resin composition was 220° C. The extruded resin composition was then extrusion cast through a T-die onto a cooling roll controlled to a surface temperature of 25° C., to obtain a cast sheet.

It was then fed into a simultaneous biaxial tenter stretching machine for biaxial stretching, to obtain a stretched sheet. The set stretching conditions were a stretching area increase of 50 to 180, and the porosity, air permeability, thickness or puncture strength was adjusted by adjusting the stretching temperature, heating air volume or stretching factor. In Example 1, the biaxial stretching temperature was 125° C.

The stretched sheet was then thoroughly immersed in dichloromethane for extraction removal of the liquid paraffin, after which the dichloromethane was dried off to obtain a porous body.

The porous body was then fed to a TD tenter for heat setting and subjected to heat setting (HS) at 128° C., after which relaxation was carried out to a factor of 0.5 in the TD direction (i.e. the HS relaxation factor was 0.5). The obtained microporous membrane was then evaluated as described above. The evaluation results are shown in Table 4.

Examples 11-2 to 11-19 and Comparative Examples II-1 to II-8

It was attempted to prepare polyolefin microporous membranes by changing the starting material composition and process conditions in Example II-1 as shown in Tables 4 to 6, and the physical property of the obtained membranes were evaluated. The evaluation results are also shown in Tables 4 to 6.

TABLE 4

| | | | Example II | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Process conditions | (1) With or without mixed slurry producing step | | With | With | With | With | With | With | With | With | With | With | With |
| | (2) Form of resin feeding in extrusion step | | Slurry | Slurry | Slurry | Slurry | Slurry | Slurry | Slurry | Slurry | Slurry | Slurry | Slurry |
| Starting material (parts by weight) | Polyolefin powder UHMWPE | | 40 | 40 | 40 | 40 | 40 | 40 | 40 | 40 | 40 | 40 | 40 |
| | Other PE | | 60 | 60 | 60 | 60 | 60 | 60 | 60 | 60 | 60 | 60 | 60 |
| | PP | | 0 | 0 | 0 | 0 | 0 | 0 | 0 | 0 | 0 | 0 | 0 |
| | Liquid paraffin (weight % of total mixture) | | 70% | 70% | 70% | 70% | 70% | 70% | 70% | 70% | 70% | 70% | 70% |
| | Additives | | StCa | StCa | StCa | StCa | StCa | StCa | StCa | StCa | StCa | StCa | StCa |
| (1) Mixed slurry producing step | Mixing temperature | (° C.) | 65 | 22 | 67 | 65 | 65 | 65 | 65 | 65 | 65 | 65 | 65 |
| | Shear rate | $sec^{-1}$ | 40,000 | 40,000 | 40,000 | 120 | 398,000 | 40,000 | 40,000 | 40,000 | 40,000 | 40,000 | 40,000 |
| | Residence time | (sec) | 20 | 20 | 20 | 20 | 20 | 2 | 56 | 20 | 20 | 20 | 20 |
| (2) Extrusion step | Feed temperature | (° C.) | 60 | 60 | 60 | 60 | 60 | 60 | 60 | 20 | 22 | 56 | 83 |
| | Extrusion temperature | (° C.) | 220 | 220 | 220 | 220 | 220 | 220 | 220 | 220 | 220 | 220 | 220 |
| (3) Sheet-forming step | Die lip gap | (μm) | 1500 | 1500 | 1500 | 1500 | 1500 | 1500 | 1500 | 1500 | 1500 | 1500 | 1500 |
| (4) Stretching step | Simultaneous or sequential biaxial stretching | | Simultaneous | Simultaneous | Simultaneous | Simultaneous | Simultaneous | Simultaneous | Simultaneous | Simultaneous | Simultaneous | Simultaneous | Simultaneous |
| | Stretching area increase | (factor) | 50-180 | 50-180 | 50-180 | 50-180 | 50-180 | 50-180 | 50-180 | 50-180 | 50-180 | 50-180 | 180 |
| (5) Extraction step | Extraction solvent | | Dichloro-methane | Dichloro-methane | Dichloro-methane | Dichloro-methane | Dichloro-methane | Dichloro-methane | Dichloro-methane | Dichloro-methane | Dichloro-methane | Dichloro-methane | Dichloro-methane |
| (6) Heat treatment step | Heat treatment temperature | (° C.) | 128 | 128 | 128 | 128 | 128 | 128 | 128 | 128 | 128 | 128 | 128 |
| Micro-porous mem-brane | Membrane thickness | (um) | 6.2 | 6.1 | 6 | 6.1 | 6.1 | 6.2 | 6.2 | 6.3 | 6.1 | 6.2 | 6.2 |
| | Porosity | (%) | 36 | 36 | 36 | 36 | 37 | 38 | 36 | 38 | 35 | 35 | 33 |
| | Air permeability | (sec/100 $cm^3$) | 152 | 151 | 150 | 152 | 153 | 150 | 152 | 152 | 151 | 153 | 152 |
| | 10 μm-equivalent transmission coefficient J | | 6.81 | 6.88 | 6.94 | 6.92 | 6.78 | 6.37 | 6.81 | 6.35 | 7.07 | 7.05 | 7.43 |
| | Strength: Puncture strength | (gf) | 410 | 403 | 390 | 384 | 378 | 378 | 378 | 145 | 372 | 372 | 190 |
| | Tensile strength | ($kgf/cm^2$) | 3300 | 3300 | 3200 | 3250 | 3250 | 3300 | 3300 | 1200 | 3250 | 3300 | 1550 |
| | Quality: Gel content | (/1000 $m^2$) | 2 | 2 | 2 | 5 | 3 | 3 | 4 | 2300 | 5 | 5 | 360 |
| | Molecular weight degradation rate | (%) | 98 | 98 | 98 | 98 | 98 | 98 | 98 | 95 | 98 | 98 | 95 |

TABLE 5

| | | | | Example II | | | | | | | |
|---|---|---|---|---|---|---|---|---|---|---|---|
| | | | | 12 | 13 | 14 | 15 | 16 | 17 | 18 | 19 |
| Process conditions | (1) With or without mixed slurry producing step | | | With | With | With | With | With | With | With | With |
| | (2) Form of resin feeding in extrusion step | | | Slurry | Slurry | Slurry | Slurry | Slurry | Slurry | Slurry | Slurry |
| Starting material (parts by weight) | Polyolefin powder | UHMWPE | | 40 | 5 | 87 | 40 | 40 | 1 | 92 | 93 |
| | | Other PE | | 60 | 95 | 13 | 55 | 60 | 99 | 8 | 2 |
| | | PP | | 0 | 0 | 0 | 5 | 0 | 0 | 0 | 5 |
| | Liquid paraffin (weight % of total mixture) | | | 70% | 70% | 70% | 70% | 70% | 70% | 70% | 70% |
| | | Additives | | StCa | StCa | StCa | StCa | StCa | StCa | StCa | StCa |
| (1) Mixed slurry producing step | | Mixing temperature | (° C.) | 65 | 65 | 65 | 65 | 65 | 65 | 65 | 65 |
| | | Shear rate | $sec^{-1}$ | 40,000 | 40,000 | 40,000 | 40,000 | 40,000 | 40,000 | 40,000 | 40,000 |
| | | Residence time | (sec) | 20 | 20 | 20 | 20 | 20 | 20 | 20 | 20 |
| (2) Extrusion step | | Feed temperature | (° C.) | 60 | 60 | 60 | 60 | 60 | 60 | 60 | 60 |
| | | Extrusion temperature | (° C.) | 220 | 220 | 220 | 220 | 220 | 220 | 220 | 220 |
| (3) Sheet-forming step | | Die lip gap | (μm) | 1500 | 1500 | 1500 | 1500 | 1500 | 1500 | 1500 | 1500 |
| (4) Stretching step | | Simultaneous or sequential biaxial stretching | | Sequential | Simultaneous | Simultaneous | Simultaneous | Simultaneous | Simultaneous | Simultaneous | Simultaneous |
| | | Stretching area increase | (factor) | 50-180 | 50-180 | 50-180 | 50-180 | 50-180 | 180 | 180 | 180 |
| (5) Extraction step | | Extraction solvent | | Dichloromethane | Dichloromethane | Dichloromethane | Dichloromethane | N-hexane | Dichloromethane | Dichloromethane | Dichloromethane |
| (6) Heat treatment step | | Heat treatment temperature | (° C.) | 128 | 128 | 128 | 128 | 128 | 128 | 128 | 128 |
| Microporous membrane | | Membrane thickness | (um) | 6.2 | 6.5 | 12 | 11 | 7 | 6.2 | 8 | 6 |
| | | Porosity | (%) | 37 | 36 | 50 | 48 | 38 | 40 | 38 | 32 |
| | | Air permeability | ($sec/100\ cm^3$) | 150 | 155 | 230 | 154 | 150 | 152 | 152 | 150 |
| | 10 μm-equivalent transmission coefficient J | | | 6.54 | 6.62 | 3,83 | 2.92 | 5.64 | 6.13 | 5.00 | 7.81 |
| | Strength | Puncture strength | (gf) | 408 | 415 | 613 | 520 | 480 | 263 | 432 | 301 |
| | | Tensile strength | ($kgf/cm^2$) | 3300 | 3460 | 3200 | 3500 | 3100 | 2122 | 2700 | 2350 |
| | Quality | Gel content | ($/1000\ m^2$) | 2 | 2 | 4 | 5 | 2 | 2 | 56 | 70 |
| | | Molecular weight degradation rate | (%) | 98 | 98 | 93 | 96 | 98 | 94 | 90 | 98 |

TABLE 6

| | | | | Comparative Example II | | | | | | | |
|---|---|---|---|---|---|---|---|---|---|---|---|
| | | | | 1 | 2 | 3 | 4 | 5 | 6 | 7 | 8 |
| Process conditions | (1) With or without mixed slurry producing step | | | Without | With | With | With | With | With | With | With |
| | (2) Form of resin feeding in extrusion step | | | Powder | Slurry | Slurry | Slurry | Slurry | Slurry | Slurry | Slurry |
| Starting material (parts by weight) | Polyolefin powder | UHMWPE | | 40 | 40 | 40 | 40 | 40 | 40 | 40 | 40 |
| | | Other PE | | 60 | 60 | 60 | 60 | 60 | 60 | | 60 |
| | | PP | | 0 | 0 | 0 | 0 | 0 | 0 | 0 | 0 |
| | Liquid paraffin (weight % of total mixture) | | | 70% | 70% | 70% | 70% | 70% | 70% | 70% | 70% |
| | | Additives | | StCa | StCa | StCa | StCa | StCa | StCa | StCa | StCa |
| (1) Mixed slurry producing step | | Mixing temperature | (° C.) | 65 | 65 | 18 | 75 | 65 | 65 | 65 | 65 |
| | | Shear rate | $sec^{-1}$ | 40,000 | 80 | 40,000 | 40,000 | 8C | 400,500 | 40,000 | 40,000 |
| | | Residence time | (sec) | 20 | 20 | 20 | 20 | 20 | 20 | 0.6 | 63 |
| (2) Extrusion step | | Feed temperature | (° C.) | 60 | 60 | 60 | 60 | 60 | 60 | 60 | 60 |
| | | Extrusion temperature | (° C.) | 220 | 220 | 220 | 220 | 220 | 220 | 220 | 220 |
| (3) Sheet-forming step | | Die lip gap | (μm) | 1500 | 1500 | 1500 | 1500 | 1500 | 1500 | 1500 | 1500 |
| (4) Stretching step | | Simultaneous or sequential biaxial stretching | | Simultaneous | Sequential | Simultaneous | Simultaneous | Simultaneous | Simultaneous | Simultaneous | Simultaneous |
| | | Stretching area increase | (factor) | 180 | 180 | 180 | 180 | 180 | 180 | 180 | 180 |
| (5) Extraction step | | Extraction solvent | | Dichloromethane | Dichloromethane | Dichloromethane | Dichloromethane | Dichloromethane | Dichloromethane | Dichloromethane | Dichloromethane |
| (6) Heat treatment step | | Heat treatment temperature | (° C.) | 128 | 128 | 128 | 128 | 128 | 128 | 128 | 128 |
| Microporous membrane | | Membrane thickness | (um) | 6.2 | 6.2 | 6.1 | 6.4 | 6.1 | 5.9 | 5.8 | 6.1 |
| | | Porosity | (%) | 36 | 36 | 36 | 36 | 36 | 36 | 36 | 36 |
| | | Air permeability | ($sec/100\ cm^3$) | 152 | 152 | 152 | 152 | 152 | 152 | 152 | 152 |
| | 10 μm-equivalent transmission coefficient J | | | 6.81 | 6.81 | 6.92 | 6.60 | 6.92 | 7.16 | 7,28 | 6.92 |
| | Strength | Puncture strength | (gf) | 98 | 130 | 190 | 175 | 110 | 179 | 125 | 105 |
| | | Tensile strength | ($kgf/cm^2$) | 800 | 1000 | 1550 | 1450 | 900 | 1500 | 1020 | 870 |
| | Quality | Gel content | ($/1000\ m^2$) | 56,000 | 23030 | 4800 | 7908 | 23,000 | 5660 | 13500 | 7600 |
| | | Molecular weight degradation rate | (%) | 78 | 70 | 69 | 75 | 60 | 65 | 66 | 52 |

The invention claimed is:

1. A method for producing a polyolefin microporous membrane separator for a lithium ion secondary battery, wherein the method comprises the following steps:

(1) a step of using a continuous mixer under conditions with a temperature of 20° C. to 70° C., a shear rate of 100 seconds$^{-1}$ to 400,000 seconds$^{-1}$ and a residence time of 1.0 seconds to 60 seconds, for mixing of a plasticizer with a polyolefin powder containing polyethylene (PE), to obtain a mixed slurry;

(2) a step of loading the mixed slurry into a twin-screw extruder and extruding the mixed slurry to produce a resin composition;

(3) a step of extruding the resin composition into a sheet and cooling the sheet to solidification to process the solidification into a cast sheet;

(4) a step of biaxially stretching the cast sheet in an area increase factor of 20 times to 200 times, to form a stretched sheet;

(5) a step of extracting the plasticizer from the stretched sheet to form a porous body; and (6) a step of heat treating the porous body at a temperature below the melting point of the porous body, and stretching the porous body, wherein the mixed slurry consists of the polyolefin powder and the plasticizer, and one or more selected from a group consisting of a dehydrating condensation catalyst, a metal soap, an ultraviolet absorbers, a light stabilizer, an antistatic agent, an anti-fogging agent, a color pigment, and an antioxidant, and wherein a weight ratio of the polyolefin powder in the mixed slurry is greater than 0 weight % and is 50 weight % or lower based on the weight of the mixed slurry.

2. The method for producing a polyolefin microporous membrane separator according to claim 1, wherein swelling, melting and/or kneading of the polyolefin powder is carried out in the twin-screw extruder in step (2).

3. The method for producing a polyolefin microporous membrane separator according to claim 1, wherein the polyethylene is ultrahigh molecular weight polyethylene (UHMWPE), and the content of UHMWPE in the polyolefin powder is 2 weight % to 90 weight % based on the weight of the polyolefin powder.

4. The method for producing a polyolefin microporous membrane separator according to claim 1, wherein the polyethylene is ultrahigh molecular weight polyethylene (UHMWPE), and the UHMWPE has a viscosity-average molecular weight (Mv) of 300,000 to 9,700,000 and a molecular weight distribution (Mw/Mn), represented as the ratio of the weight-average molecular weight (Mw) with respect to the number-average molecular weight (Mn), of 3 to 15.

5. The method for producing a polyolefin microporous membrane separator according to claim 1, wherein the mixed slurry is fed to the twin-screw extruder at a temperature of 25° C. to 80° C. in step (2) to produce the resin composition.

6. The method for producing a polyolefin microporous membrane separator according to claim 1, wherein the porous body is stretched in the transverse direction and/or the lengthwise direction in step (6).

7. The method for producing a polyolefin microporous membrane separator according to claim 1, wherein the degree of crystallinity of the polyethylene of the polyolefin microporous membrane is 80 to 99% as measured by X-ray diffraction (XRD), and the crystallite size of the polyethylene of the polyolefin microporous membrane is 14.2 to 40.0 nm as measured by XRD, and wherein the cross-sectional crystal orientation of the polyolefin microporous membrane is 0.80 to 0.99.

8. The method for producing a polyolefin microporous membrane separator according to claim 1, wherein the equivalent mean pore size calculated according to Porod's law is 50 nm to 150 nm, for small angle X-ray scattering (SAXS) measurement of the polyolefin microporous membrane.

9. The method for producing a polyolefin microporous membrane separator according to claim 2, wherein the polyethylene is ultrahigh molecular weight polyethylene (UHMWPE), and the content of UHMWPE in the polyolefin powder is 2 weight % to 90 weight % based on the weight of the polyolefin powder.

10. The method for producing a polyolefin microporous membrane separator according to claim 2, wherein the polyethylene is ultrahigh molecular weight polyethylene (UHMWPE), and the UHMWPE has a viscosity-average molecular weight (Mv) of 300,000 to 9,700,000 and a molecular weight distribution (Mw/Mn), represented as the ratio of the weight-average molecular weight (Mw) with respect to the number-average molecular weight (Mn), of 3 to 15.

11. The method for producing a polyolefin microporous membrane separator according to claim 2, wherein the mixed slurry is fed to the twin-screw extruder at a temperature of 25° C. to 80° C. in step (2) to produce the resin composition.

12. The method for producing a polyolefin microporous membrane separator according to claim 2, wherein the porous body is stretched in the transverse direction and/or the lengthwise direction in step (6).

13. The method for producing a polyolefin microporous membrane separator according to claim 2, wherein the degree of crystallinity of the polyethylene of the polyolefin microporous membrane is 80 to 99% as measured by X-ray diffraction (XRD), and the crystallite size of the polyethylene of the polyolefin microporous membrane is 14.2 to 40.0 nm as measured by XRD, and wherein the cross-sectional crystal orientation of the polyolefin microporous membrane is 0.80 to 0.99.

14. The method for producing a polyolefin microporous membrane separator according to claim 2, wherein the equivalent mean pore size calculated according to Porod's law is 50 nm to 150 nm, for small angle X-ray scattering (SAXS) measurement of the polyolefin microporous membrane.

15. The method for producing a polyolefin microporous membrane separator according to claim 1, wherein the weight ratio of the polyolefin powder in the mixed slurry is greater than 0 weight % and is 40 weight % or lower based on the weight of the mixed slurry.

16. The method for producing a polyolefin microporous membrane separator according to claim 1, wherein the weight ratio of the polyolefin powder in the mixed slurry is greater than 0 weight % and is 30 weight % or lower based on the weight of the mixed slurry.

17. A method for producing a polyolefin microporous membrane separator for a lithium ion secondary battery, wherein the method comprises the following steps:

(1) a step of using a continuous mixer under conditions with a temperature of 20° C. to 70° C., a shear rate of 100 seconds$^{-1}$ to 400,000 seconds$^{-1}$ and a residence time of 1.0 seconds to 60 seconds, for mixing of a plasticizer with a polyolefin powder containing polyethylene (PE), to obtain a mixed slurry;

(2) a step of loading the mixed slurry into a twin-screw extruder and extruding the mixed slurry to produce a resin composition;

(3) a step of extruding the resin composition into a sheet and cooling the sheet to solidification to process the solidification into a cast sheet;

(4) a step of biaxially stretching the cast sheet in an area increase factor of 20 times to 200 times, to form a stretched sheet;

(5) a step of extracting the plasticizer from the stretched sheet to form a porous body; and (6) a step of heat treating the porous body at a temperature below the melting point of the porous body, and stretching the porous body, wherein the mixed slurry consists essentially of the polyolefin powder and the plasticizer, and wherein a weight ratio of the polyolefin powder in the mixed slurry is greater than 0 weight % and is 50 weight % or lower.

18. A method for producing a polyolefin microporous membrane separator for a lithium ion secondary battery, wherein the method comprises the following steps:

(1) a step of using a continuous mixer under conditions with a temperature of 20° C. to 70° C., a shear rate of 100 seconds$^{-1}$ to 400,000 seconds$^{-1}$ and a residence time of 1.0 seconds to 60 seconds, for mixing of a plasticizer with a polyolefin powder containing polyethylene (PE), to obtain a mixed slurry;

(2) a step of loading the mixed slurry into a twin-screw extruder and extruding the mixed slurry to produce a resin composition;

(3) a step of extruding the resin composition into a sheet and cooling the sheet to solidification to process the solidification into a cast sheet;

(4) a step of biaxially stretching the cast sheet in an area increase factor of 20 times to 200 times, to form a stretched sheet;

(5) a step of extracting the plasticizer from the stretched sheet to form a porous body; and (6) a step of heat treating the porous body at a temperature below the melting point of the porous body, and stretching the porous body, wherein the mixed slurry consists essentially of the polyolefin powder and the plasticizer, and one or more selected from a group consisting of a dehydrating condensation catalyst, a metal soap, an ultraviolet absorbers, a light stabilizer, an antistatic agent, an anti-fogging agent, a color pigment, and an antioxidant, and wherein a weight ratio of the polyolefin powder in the mixed slurry is greater than 0 weight % and is 50 weight % or lower.

* * * * *